US012010128B2

(12) United States Patent
Joshi et al.

(10) Patent No.: US 12,010,128 B2
(45) Date of Patent: Jun. 11, 2024

(54) METHODS, SYSTEMS, ARTICLES OF MANUFACTURE AND APPARATUS TO BUILD PRIVACY PRESERVING MODELS

(71) Applicant: McAfee, LLC, San Jose, CA (US)

(72) Inventors: Piyush P. Joshi, Aurangabad (IN); Abhishek Tripathi, Bangalore (IN); Tirumaleswar Reddy Konda, Bangalore (IN)

(73) Assignee: McAfee, LLC, San Jose, CA (US)

( * ) Notice: Subject to any disclaimer, the term of this patent is extended or adjusted under 35 U.S.C. 154(b) by 307 days.

(21) Appl. No.: 17/125,364

(22) Filed: Dec. 17, 2020

(65) Prior Publication Data

US 2022/0201021 A1 Jun. 23, 2022

(51) Int. Cl.
*H04L 9/40* (2022.01)
*G06F 18/21* (2023.01)
*G06F 18/214* (2023.01)

(52) U.S. Cl.
CPC ...... *H04L 63/1425* (2013.01); *G06F 18/2148* (2023.01); *G06F 18/217* (2023.01); *H04L 63/1416* (2013.01)

(58) Field of Classification Search
CPC .. G06K 9/6257; G06K 9/6262; G06K 9/6259; H04L 63/1416; H04L 63/1425; H04L 41/16; H04L 41/145; H04L 63/14; H04L 63/1408; H04L 63/1433
See application file for complete search history.

(56) References Cited

U.S. PATENT DOCUMENTS

| 10,282,623 | B1 * | 5/2019 | Ziyaee | G06V 10/764 |
|---|---|---|---|---|
| 2015/0324686 | A1 * | 11/2015 | Julian | G06N 3/08 |
| | | | | 706/25 |
| 2019/0385610 | A1 * | 12/2019 | Steelberg | G10L 25/90 |
| 2021/0051169 | A1 * | 2/2021 | Karame | G06N 5/04 |
| 2021/0073532 | A1 * | 3/2021 | Torres | G06V 30/414 |
| 2021/0133438 | A1 * | 5/2021 | Florencio | G06F 18/41 |
| 2021/0174257 | A1 * | 6/2021 | Pothula | G06F 16/27 |

(Continued)

OTHER PUBLICATIONS

Bonawitz et al. "Towards Federated Learning at Scale: System Design," Proceedings of the 2nd SysML Conference, 2019, 15 pages.

(Continued)

*Primary Examiner* — Muhammad Raza
(74) *Attorney, Agent, or Firm* — HANLEY, FLIGHT & ZIMMERMAN, LLC

(57) ABSTRACT

Methods, apparatus, systems and articles of manufacture are disclosed to build privacy preserving models. An example apparatus disclosed herein includes a training manager to generate a first modeling plan for client-side resources, and transmit the first modeling plan to the client-side resources. The example apparatus also includes a data aggregator to search for a primary validation flag in response to retrieving client-side model parameters, and an accuracy calculator to, in response to detecting the primary validation flag, perform a secondary validation corresponding to the client-side model parameters using a server-side ground truth data set, and determine whether to update the global model with the client-side model parameters based on a comparison of results of the secondary validation and a validation threshold.

9 Claims, 14 Drawing Sheets

(56) References Cited

U.S. PATENT DOCUMENTS

2021/0256309 A1\* 8/2021 Huth .................. G06F 21/6245
2021/0365420 A1\* 11/2021 Sahu ..................... G06N 20/00

OTHER PUBLICATIONS

Mcmahan et al. "Communication-Efficient Learning of Deep Networks from Decentralized Data," Proceedings of the 20th International Conference on Artificial Intelligence and Statistics (AISTATS), 2017, 11 pages.

Abadi et al. "Deep Learning with Differential Privacy," Proceedings of the 23rd ACM Conference on Computer and Communications Security (CCS), 2016, 14 pages.

\* cited by examiner

METHODS, SYSTEMS, ARTICLES OF MANUFACTURE AND APPARATUS TO BUILD PRIVACY PRESERVING MODELS

FIELD OF THE DISCLOSURE

This disclosure relates generally to network security, and, more particularly, to methods, systems, articles of manufacture, and apparatus to build privacy preserving models.

BACKGROUND

In recent years, in-home routers have been developed to provide network security to networks and to the devices on those networks. Systems have been developed using telemetry data to train machine learning (ML) models to perform anomaly detection and/or device identification. These models can then be utilized by networks to protect devices and the networks from security risks.

BRIEF DESCRIPTION OF THE DRAWINGS

The figures are not to scale. In general, the same reference numbers will be used throughout the drawing(s) and accompanying written description to refer to the same or like parts.

Figure 1:
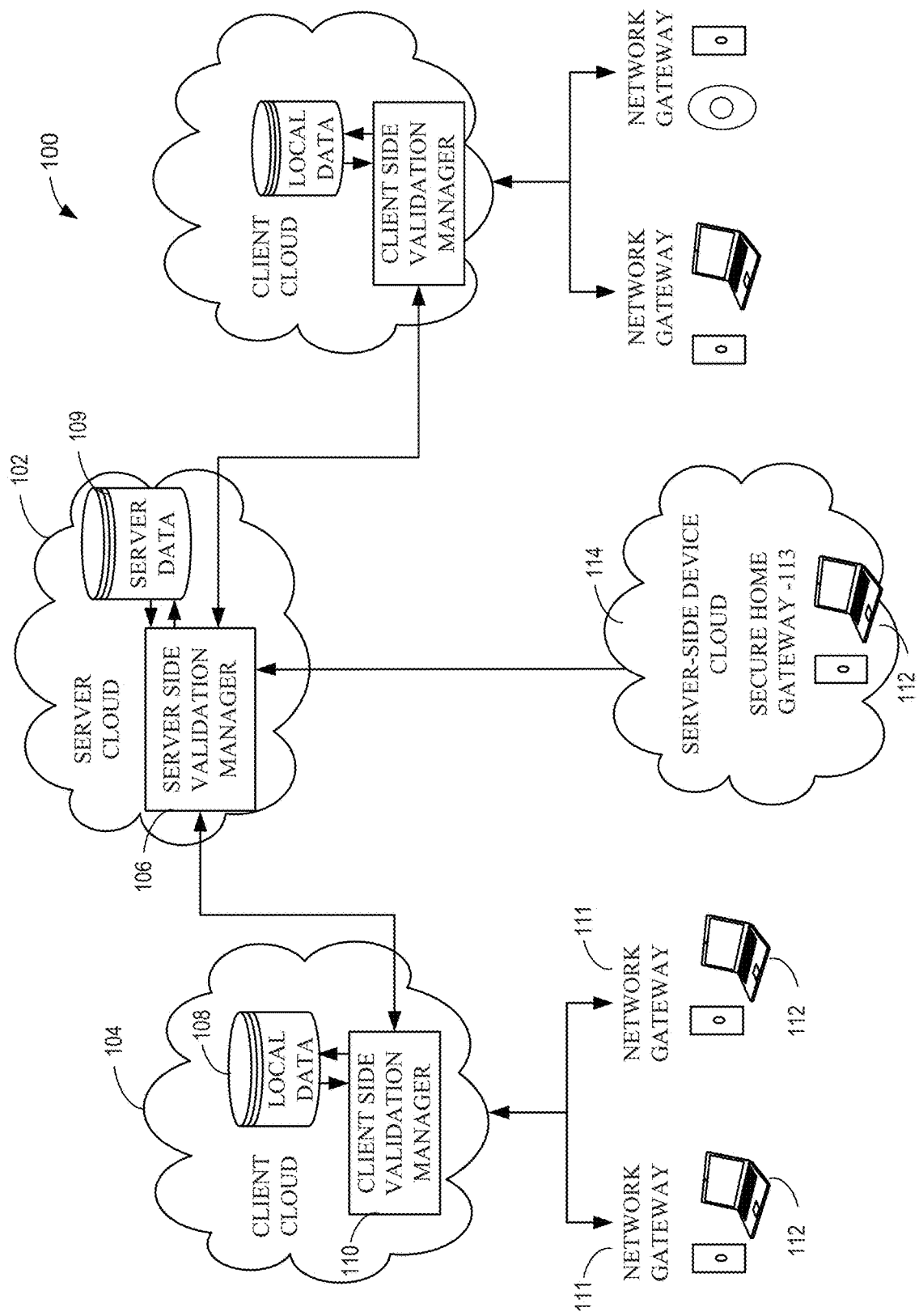
FIG. 1 is a block diagram illustrating an example privacy preserving system constructed in accordance with the teachings of this disclosure to build privacy preserving models.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Network security techniques involve capturing internet service providers (ISP) subscriber network telemetry data (e.g., universal plug and play (UPnP), domain name system (DNS), multicast DNS (mDNS), Internet protocol (IP) flow data, transport layer security (TLS) metadata, etc.) and routing it to a central cloud network (e.g. McAfee Internet of Things (IoT) Secure Home Cloud). The network telemetry data is used to train machine learning (ML) models that can be built for anomaly detection, device identification, or any other security model related to protecting users on one or more networks. Example ML models are typically trained in the central cloud network (e.g., computing resources of the central cloud network) using the network telemetry data of users that are subscribed to a secure home subscription. In some examples, the subscribers have purchased a secure home router device and/or are a part of an enterprise that is subscribed to a security provider. However, network telemetry data quickly becomes expensive in terms of sending, storing, and processing data collected from many (e.g., millions) of networks (e.g., home networks, enterprise networks, etc.). Additionally, ISPs are increasingly setting privacy constraints on sharing their subscribers network telemetry data to avoid security breaches (e.g., leaked or stolen information). Network telemetry data can contain personal identification information (PII) and/or data from which PII can be derived. Therefore, there are increasing concerns over protecting user information as well as following privacy and protection laws (e.g., General Data Protection Regulation (GDPR) laws).

To address these privacy concerns ISPs are inclined to deploy security solutions in a virtual network in one or more resources (e.g., computing resources) under the control and/or management of the ISP (e.g., resources corresponding to the ISP's cloud network(s)). This enables user data (sometimes referred to herein as "telemetry data") to be integrated with one or more ML models in the local ISP domain (e.g., resources within the ISP local cloud) without sending the data to an external third party. By doing so, ISPs do not violate any privacy concerns while still providing security solutions to be built in their cloud. Further, by implementing a federated learning framework, an external cloud service (e.g. McAfee IoT Cloud Service) can be used to host global models. These global models can be updated using model information (e.g., tokenized model information) from ISP local cloud models and/or from unmanaged client user telemetry data. A federated learning security framework allows for stronger ML models due to the ability to train a global model in a server from a plurality of client models.

However, ML models built for network security could be poisoned by a coordinated attack on the training of the ML model. For example, in the event one of several ISP clouds (and computing resources contained therein) is compromised by an attacker, that attacker may flood the local network with false information (e.g., telemetry data containing false device IDs). In this example, one or more ML models being trained to detect outlier device IDs may now be poisoned and fail to detect an attacker's device ID.

Unlike traditional federated learning approaches of ML model development, examples disclosed herein enable robust validation including a two-tier validation (sometimes referred to as a two-phase validation or a two-stage validation) approach to reduce the effects of attack attempts. Example federated learning approaches disclosed herein enable ML models existing in a client's local cloud to be validated (e.g., stage 1 validation) after training and before sending tokenized data to a server (e.g., a server communicatively connected to any number of ISPs, ISP clouds, etc.). Additionally, the example server processes validated tokenized data sent to it and uses that data to train a global model. Unlike raw telemetry data that may contain information deemed sensitive and/or otherwise personal, tokenized data removes indications of personally identifiable information (PII). In some examples, tokenized data includes model parameters that include no indication of labelling. In addition to validation of the local ML models (e.g., stage 1 validation), examples disclosed herein enable global ML models to be validated (e.g., stage 2 validation) to ensure they were not compromised and/or to ensure that they perform better by adjusting them based on validated local models, as described in further detail below. In particular, and as described in further detail below, examples disclosed herein prevent global models from being updated with local model data in circumstances where client-side model data validation (e.g., stage 1 validation) has not occurred. For example, in the event a particular client is compromised, model parameters corresponding to that client may be poisoned in an effort to weaken and/or otherwise disrupt the efficacy of a global model derived from any number of local client models. Two stage validation efforts disclosed herein reduce a likelihood of such poisoned model parameters from adversely affecting the global model.

By using a federated learning approach to network security, much more effective and privacy-compliant ML models are built while abiding by the privacy concerns of ISPs. Additionally, the computational and/or network bandwidth burden (e.g., cost) of telemetry data is significantly improved (e.g., reduced) due to tokenization of network telemetry data, allowing for a much more efficient security framework. Accordingly, methods, systems, articles of manufacture and apparatus for building privacy preserving ML models via a federated learning security approach are disclosed herein.

As used herein, tokenization is the process of deriving smaller data samples from an original data sample while protecting the original content of the data. In some examples, tokenization is used to reduce the amount of data that is sent. Additionally, tokenization can be used to abstract, parameterize, and/or otherwise change the original data sample. In some examples, traditional model details are tokenized by way of generating a matrix of model weights and/or model parameters, which are devoid of personal information. In some examples, tokenization reduces the size of transferred data from client to server or sever to client and helps to comply with the privacy expectations of ISPs. In some examples, a system tokenizes large samples of network telemetry data to avoid communicating any explicit telemetry information, and such tokenized data only includes information relevant for training a ML model. In this example, the data after tokenization contains no PII or data that would allow PII to be derived, while still containing information that is relevant to training a ML model. Further, because examples disclosed herein do not require that multiple ISPs send telemetry data to the server, communication bandwidth costs and processing costs to the server are reduced.

FIG. 1 illustrates an example privacy preserving system 100 that includes a server cloud 102 and any number of participating client clouds 104 and/or server-side device clouds 114. As used herein, a "server cloud" represents one or more groupings of structure managed by a server entity, such as a malware detection entity (e.g., McAfee®). Additionally, references to structure and operations exhibited by the server entity are sometimes referred to herein as "server-side" elements/structure/processes. Similarly, references to structure and operations exhibited by a client-side entity (e.g., Internet Service Providers (ISPs), subscribers/users of the ISPs, etc.) are sometimes referred to herein as "client-side" elements/structure/processes. In the illustrated example of FIG. 1, the server cloud 102 includes a server-side validation manager 106 and a server-side data storage 109. In the illustrated example of FIG. 1, each client cloud 104 includes a client-side validation manager 110 and a local data storage 108. Communicatively connected to each example client cloud 104 is at least one network gateway 111 (sometimes referred to herein as a secure home gateway). Communicatively connected to each gateway 111 is at least one computing device 112. References to the example one or more computing devices 112 will be referred-to herein as an internet of things (IoT) device 112, but examples are not limited thereto.

In the illustrated example of FIG. 1, the IoT device 112 that is connected to the client cloud 104 or a server-side device cloud 114 (sometimes referred to herein as a "ground truth cloud") via the network gateway 111 creates telemetry data. In some examples, a homeowner, an enterprise device, other network user, or internet provider (e.g., an ISP) subscribes to a third-party security provider (e.g., McAfee Secure Home Network-SHP). In some examples, an entity that subscribes to such a service has agreed to allow this third party (e.g., McAfee®) to protect their network and therefore, allows their telemetry data to be sent directly to the security provider's server cloud 102 without processing or tokenization being done in between the server-cloud 102 and the devices connected to the gateways 111. Therefore, the example telemetry data collected at the example client's local cloud network (e.g., the example gateways 111) can be processed at the clients local cloud 104). Additionally, a subscriber may purchase or receive, as part of the subscription, a secure home gateway (e.g., the example secure home gateway, such as the network gateway 111) that contains security provider hardware, firmware, and/or software. The example secure home gateway can collect telemetry data and send packaged data to the security provider's server cloud (e.g., the example server cloud 102) with and/or without going through the subscriber's internet provider's (e.g., ISP) cloud.

However, the free flow of telemetry data between subscribers of an ISP and a third-party chartered with the responsibility to perform security tasks (e.g., McAfee®) is not desired. Instead, clients and ISPs alike desire competent services and/or protection without relinquishing so much data that might be deemed private (e.g., telemetry data having labels that indicates port numbers, device manufacturers, device models, time-of-use, etc.). In some examples, a homeowner, enterprise, or other network user, subscribes to a third-party security service and specifically does not permit the direct use of the entity's telemetry data. In these cases, the client cloud 104 (e.g., local to the ISP) can be utilized for storing, processing, and tokenizing user telemetry data while complying with the concerns over the telemetry data.

In some examples, telemetry data is information related to a device's Internet use or information about the device itself (e.g., UPnP, mDNS, DNS, IP flow data, and TLS metadata). Example telemetry data contains information that may be very useful for training ML models to detect security threats. In some examples, telemetry data produced by the IoT devices 112 connected to the client network may send that data, via the network gateway 111 or other edge device, to the client cloud 104. The telemetry data may then be stored in the local storage 108 of the client cloud 104 and the telemetry data may be accessed by the client-side validation manager 110 to be used for ML applications existing in the client cloud 104. In some examples, the network gateway 111 is a gateway that includes third-party security provider services. As such, the gateway may allow for user input through an application or user interface, which can provide additional data and/or labeled data. In some examples, telemetry data can contain information about devices on a network (e.g., device manufacturers, device models, etc.). A model may be trained with the identification information of those devices and, therefore a new device or type of device that connects to the network can easily be identified, flagged, and/or disconnected to remedy one or more security threats. In some examples a validation step may be executed by a client-side validation manager to validate the output of one or more ML models, as described in further detail below.

In the illustrated example of FIG. 1, each client cloud 104 is connected to the server cloud 102 via a communication network of the server-side validation manager 106 and each client-side validation manager 110. In some examples, the server-side validation manager 106 sends the client-side validation manager 110 a plan, the plan containing information about one or more tasks and/or updates for the client to process to perform. The example plan includes, but is not limited to, instructions and/or parameters that are forwarded to one or more client-side validation managers 110. For example, the plan may include an ML model configuration (e.g., model weights, number of neural network (NN) layers and/or an activation function), training parameters for that model (e.g., epoch and/or batch size, a quantity of training dataset iterations, a quantity of model inference operations, etc.), and/or a periodicity defining how often the model should be trained as well as how often a client-side validation manager 110 should communicate to the server-side validation manager 106. Additionally, the client-side validation manager 110 sends data to the server-side validation manager 106 as described. As described above, the data is tokenized to protect user personally identifiable information (PII) and abide by the standards set by a client (e.g. an ISP). In some examples the server-side validation manager 106 generates global ML models updated by processing the data sent by any number of the client-side validation managers 110. In some examples the outputs of a global ML model existing in the server cloud 102 are validated by the server-side validation manager 106 and, if valid (e.g., if metrics corresponding to model accuracy satisfy one or more thresholds), sends model updates to the client-side validation manager 110 to update a local model with a global model. Validity is found by inputting ground truth data (e.g., known to be legitimate) into the model and comparing the model's outputs to ground truth outputs. The comparison is done by calculating an accuracy value using an accuracy function (e.g., an error function, difference, etc.). In operation, the server-side validation manager 106 receives tokenized telemetry data from many clients, processes the data, and trains a global model to produce well trained, efficacious ML models that can then replace local models existing in client clouds. By doing so, the privacy of clients' users is preserved while maintaining a secure network. Additionally, there are at least two validation steps occurring, at least one carried out by the client-side validation manager 110 and at least one more carried out by the server-side validation manager 106.

Figure 2:
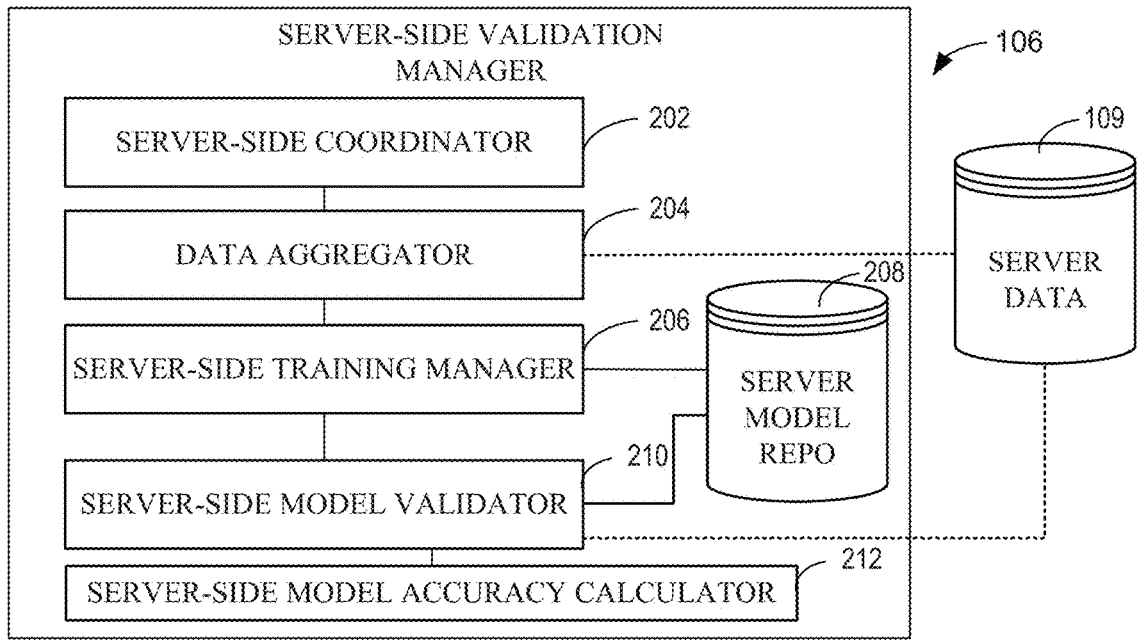
FIG. 2 is a block diagram of the server-side validation manager of the example privacy preserving system of FIG. 1.

FIG. 2 illustrates additional detail associated with the example server-side validation manager 106 of FIG. 1. In the illustrated example of FIG. 2, the server-side validation manager 106 includes an example coordinator 202, an example data aggregator 204, an example server training manager 206, an example server validation manager 210, and an example model repository 208. The illustrated example of FIG. 2 also includes the example server data storage 109 which is communicatively connected to the server-side validation manager 106. In some examples, a plan may be configured through the coordinator 202. The example plan includes, but is not limited to, an instruction and/or parameters that are forwarded to one or more client-side validation manager, 110. For example, the plan may include an ML model configuration (e.g., model weights, number of neural network (NN) layers and/or an activation function), training parameters for that model (e.g., epoch and/or batch size), and/or a periodicity defining how often the model should be trained as well as how often a client-side validation manager 110 should communicate to the server-side validation manager 106. The example instructions and parameters included in the plan may be related to a chosen model from the model repository 208. The example periodicity parameter may be based on the frequency of data collection at a client cloud 104 or the time it may take for the data collected at a client cloud 104 to be significant enough for ML model training. Additionally, the example periodicity parameter may be configured to be any periodicity desired. The example periodicity component may be useful in reducing bandwidth of communication between a client and server. Further, the example plan configured by the server-side coordinator 202 may include any instruction that can be carried out by a client-side validation manager 110.

In operation, the example server-side coordinator 202 prepares and sends the plan to the example client-side validation manager 110. In some examples, the client-side validation manager 106 sends back tokenized data to be processed by the example data aggregator 204. The example data aggregator 204 receives tokenized data from any number of clients corresponding to a same model being trained in any number of client clouds 104. In some examples all tokenized data sent to the data aggregator 204 is flagged with a validation classification. A first of any number of validation tests, tiers or phases is sometimes referred to herein as a primary validation. A subsequent validation operation is sometimes referred to herein as a secondary validation. However, examples disclosed herein are not limited to one or two validation phases. The classification is added to the tokenized message as a flag (e.g., a signal, bit, data, etc.), that signifies whether the sent data is valid or invalid, after the client-side validation occurs in the client-side validation manager 110. The classification being valid if ground truth data stored in the local data storage 108, after being run through the trained model in the example client cloud 104, passes with a confidence metric over a configurable threshold. The classification being invalid if the ground truth data stored in the local data storage 108, after being run through the trained model in the example client cloud 104, does not pass with a confidence metric over the configured threshold. Using this information, the example data aggregator 204 discards data flagged as invalid and averages the data that was flagged as valid. The example server training manager 206 receives and/or otherwise retrieves the output of the averaged data to train a global model. In some examples, both invalid and valid data received by the data aggregator 204 is utilized. For example, an ML model may be built and trained by invalid flagged data to recognize and detect security threats, while an ML model may also be built and trained using valid flagged data to detect anomalies. Additionally, the data may be stored in an example server data storage 109 for later training or verification purposes.

In some examples, the server-side training manager 206 selects a model from the model repository 208 that complements (e.g., identify models of a similar/same type, similar/same objective, similar neural network structure, etc.) the models used in the client cloud 104 related to the received tokenized data. Stated differently, different models include different objectives and/or abilities. In the event tasks related to device identification (e.g., attempts to identify types of IoT devices and/or other client devices of an ISP) are desired, then one or more models directed to that objective are selected by the example server-side training manager 206. The example server-side training manager 206 configures a selected ML model with model parameters and configuration information. The example server-side training manager 206 then uses processed data from the example data aggregator 204 to train the selected and configured model. The example model acts as a global model as it is typically trained using data from any number of client clouds. In other examples, a model selected from the example model repository 208 is trained using non tokenized aggregated telemetry data. The communication of information from devices connected to a ground truth network (e.g., the example server-side device cloud 114 containing server-managed devices of known type) is not limited as they do not have a managing client applying constraints on sharable data. Therefore, full telemetry data may be received by the example data aggregator 204 of the example server-side validation manager 106 processed by the example data aggregator 204. In some examples, the telemetry data received from ground truth clouds may be used, after being processed by a data aggregator 204, by a server training manager 206 to train models independently from the models trained by client clouds. In other examples, the data received from the ground truth cloud 114 can be used in conjunction with data received from client clouds 104 to train global models.

Typically, after a global model has been trained, the model is validated by the example server-side model validator 210. In some examples, the server-side model validator 210 accesses ground truth data stored in the server data storage 109 and inputs ground truth data to the global model. The example server-side model validator 210 selects the appropriate ground truth data from the example server data storage 109 with respect to the global model being validated. For example, if a global model was trained for device identification, the example server data storage 109 might contain a list of known devices with identification information about each device. The example server-side model validator 210 then compares the outputs of the global model to ground truth outputs to determine an accuracy (e.g., confidence level) of the global model. The accuracy may be determined by an error function (e.g., mean square error (MSE), root MSE (RMSE), etc.) or any other function that can determine an accuracy value. The accuracy value is then compared to a configurable threshold. If the accuracy satisfies the threshold, the model is valid. In some examples, if the global model is validated by the example server-side model validator 210, the example server-side coordinator 202 constructs a plan with instructions for a client to update a client model with global model parameters. For example, the plan may include an instruction for updating a specified model, an updated ML model configuration (e.g., model weights, NN layers and/or an activation function), updated training parameters for that model (e.g., epoch and/or batch size), and/or an updated periodicity. If the global model's accuracy does not satisfy the configured threshold, it is invalid. In some examples, if the global model is determined to be invalid by the example server-side model validator 210, the global model is retrained and the example server-side coordinator 202 constructs a plan containing instruction to retrain client local models as well. In other examples, the server-side model validator 210 with the data aggregator 204 determines which client(s) was infected and only have the coordinator 202 construct a plan with instructions and/or parameters to retrain the infected client's local model. In some examples, the invalid global model's outputs may be stored in the server data storage to be used for future training or validation purposes.

Figure 3:
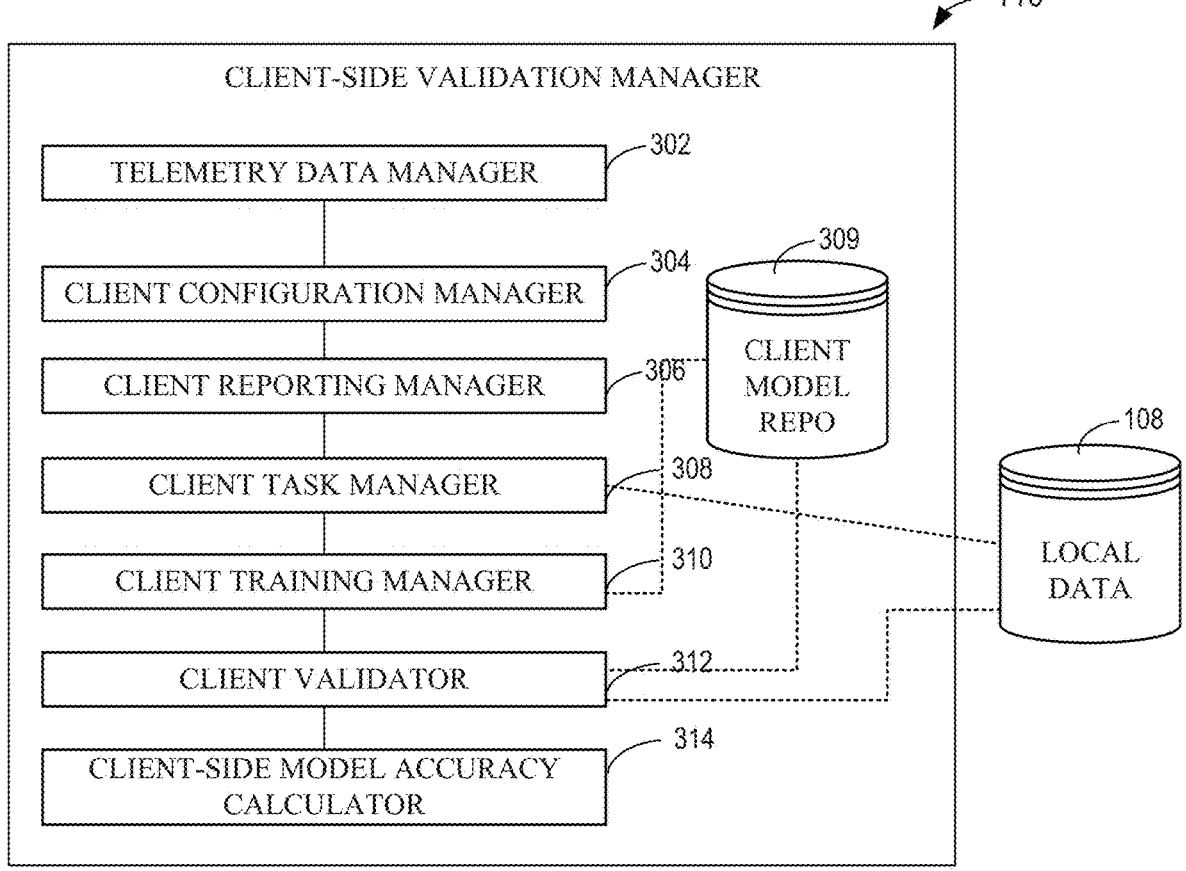
FIG. 3 is a block diagram of the client-side validation manager of the example privacy preserving system of FIG. 1.

FIG. 3 illustrates additional detail associated with the example client-side validation manager 110 of FIG. 1. In the illustrated example of FIG. 3, the client-side validation manager 110 includes an example telemetry data manager 302, an example client configuration manager 304, an example client reporting manager 306, an examples client task manager 308, an example client training manager 310, an example client-side model validator 312, and an example client-side model accuracy calculator 314. The illustrated example of FIG. 3 also includes the example local data storage 108 which is communicatively connected to the client-side validation manager 110. In some examples, a plan is created by a server-side validation manager 106. The plan may include instructions for a client-side validation manager 110 to execute one or more tasks in a particular manner, the example tasks including, but not limited to, model training, model updating, model validating, and/or validation updating. The example client configuration manager 304 checks (e.g., periodically, aperiodically, manually, on a scheduled basis, etc.) if the client-side validation manager 110 has received a plan from the server-side validation manager 106. If a plan has been received, the client configuration manager 304 sends an acknowledgment to the server-side validation manager 106 and notifies the client task manager 308 so it can start to process the received data. The example client task manager 308 parses the plan, extracting, reformatting, and storing the data. In operation, the client task manager 308 determines which structure will carry out the instructions of the plan (e.g., the client training manager 310, the client validation manager 312, etc.).

In some examples, a plan with instructions to train a local client ML model will prompt the client training manager 310 to access the reformatted training information that was included in the plan data and execute the training. The example client training manager 310 accesses the client model repository 309 and extracts the model (or model parameters) that was specified in the plan instruction. In some examples, the client training manager 310 accesses the ML model configurations (e.g., model weights, NN layers and/or an activation function) and/or training parameters (e.g., epoch and/or batch size) that were stored after being parsed from the plan and reformatted to set up the model for training. In some examples, the local data storage 108 categorizes and stores telemetry data produced by IoT devices 112 connected to the client network. Telemetry data is categorized in relation to its type (e.g., device ID, UPnP, mDNS, DNS, IP flow data, and TLS metadata, ground truth, etc.) and therefore can be accessed by category relevant to a specific model and/or task. The example client training manager 310 then executes training by accessing the data stored in the local data 108 relevant to the model being trained and begins training with specified ML algorithm (e.g., linear regression (LR), support vector machine (SVN), stochastic gradient descent (SGD), etc.), learning type (e.g., supervised, semi-supervised, or unsupervised), modeling type (e.g., classification, regression, etc.), and training parameters (e.g., epoch, batch size, etc.).

In some examples, once a training cycle has completed (e.g., completed last epoch for one period), the client-side model validator 312 validates the newly trained model. Additionally, a validation step being carried out by the client-side model validator 312 may be periodic as well (e.g., occurring after a configured number of training cycles). In some examples, the client-side model validator 312 accesses ground truth data stored in the local data storage 108 and inputs ground truth data to the local model. The example client-side model validator 312 selects the appropriate ground truth data from the example local data storage 108 with respect to the local model being validated. For example, if a local model was trained for device identification, the example local data storage 108 might contain a list of known devices with identification information about each device. The example client-side model validator 312 then compares the outputs of the local model to ground truth outputs to determine an accuracy (e.g., confidence level) of the local model. The accuracy may be determined by an error function (e.g., mean square error (MSE), root MSE (RMSE), etc.) or any other function that can determine an accuracy value. The accuracy value is then compared to a configurable threshold. If the accuracy is above the threshold, the model is valid. In some examples, if the local model is validated (e.g., the accuracy value is above the threshold) by the example client-side model validator 312, the example client reporting manager 306 communicates the new model by sending tokenized data. The tokenized data may include, but is not limited to, any number of weights of the ML model (e.g., input weights, hidden layer weights, and/or output weights), tokenized telemetry data, training information (e.g., time it took to train, accuracy value, etc.), and/or model type so the data aggregator 204 can gather all information from any number of client-side validation managers 110 pertaining to the same model type.

If the global model's accuracy is below the configured threshold, it is invalid. An invalid model does not necessarily indicate a compromised training cycle and/or model. It is possible to over train models such that the model no longer accomplishes its original purpose. Therefore, in some examples, the client validator 312 can determine whether the model has been compromised or not by utilizing a different model, applying the training data as inputs to the model, and comparing the outputs to ground truth outputs using an accuracy threshold to see if any are malicious (e.g., illegitimate data, poison attempt, etc.) to the model. In some examples, an older model with the same model type can be accessed from the client model repository 309. In some examples, the client reporting manager 304 can request a model update from the server-side validation manager 106. The server-side validation manager 106 will respond to the client-side validation manager 110 with a plan to update the specific model with the global model configuration and/or parameters. If determined to be malicious, the data can be erased and the model, either replaced by the global model, or retrained. In some examples, malicious data is stored and labeled as such, as it can be useful to train a malicious flow detection model and/or other model. In some examples, malicious data is sent to the server-side validation manager 106 to store the labeled malicious data in the server data storage 109 and/or train models with that data.

In some examples, the same training configuration can be executed periodically according to the periodicity specified in the plan, the periodicity determined by a training time, a data acquisition time, or any specified time interval. Therefore, training can run periodically, or anytime instructed by a plan. Additionally, any number of plans may be sent to the client-side validation manager 110. These plans may instruct the example client-side validation manager 110 to replace a task with a new one and/or run any number of tasks in parallel (e.g., at the same time) to each other. For example, in a client cloud 104, a model can be trained with device IDs while another model is trained with IP flow data, in the same cloud.

In some examples, a plan with instructions to update a local client ML model, after a global model has been validated, will prompt the client training manager 310 to access the reformatted model update information that was included in the plan data and execute the updates. An update might include, but is not limited to, updated model weights (e.g., input weights, hidden layer weights, and/or output weights), ML model configuration (e.g., NN layers and/or an activation function), and/or any other updates. The client task manager 308 executes model updates by accessing the model specified in the plan from the client model repository 309 and reconfiguring the model and/or updated the model parameter values. Additionally, a task may include an instruction to delete a model from the client model repository 309 and/or create a new model.

In some examples, a plan with instructions to validate a local client ML model will prompt the client-side model validator 312 to access the reformatted model validation information that was included in the plan and execute the validation. A validation task may be sent to the client-side model validator 312 independent of a training cycle (e.g., at any time). Additionally, a task may include instructions to validate any number of models in parallel (e.g., at the same time). In some examples, a task will include an instruction to update validation values. The example update instruction may include, but is not limited to, an updated accuracy threshold value, an updated accuracy function (e.g., error function, difference, etc.). In some examples, a task includes both an instruction to update validation values and an instruction to perform a validation.

In addition to communication with the server-side validation manager 106, the client-side validation manager 110 receives telemetry data from a network gateway (e.g., the example network gateway 111 of FIG. 1) or any other network edge device. In some examples, the telemetry data that is produced by devices on a network is collected at a network gateway and is packaged and/or reformatted before being sent to the client-side validation manager 110. When received, the data must be reformatted and stored in such a way that it can be used for training, validation, and/or to be sent to the server-side validation manager 106. In some examples, the telemetry data manager 302 receives the telemetry data from any number of network gateways communicatively connected to the example client cloud 104. In operation, the example telemetry data manager 302 will reformat and parse the data, extracting useful information, and store it in the client local data 108. The telemetry data manager 302 may also send the processed telemetry data to the client training manager 310, the client-side model validation manager 312, and/or the client reporting manager 306 directly. Additionally, when an instruction to send telemetry data is received or when desired, the telemetry data manager 302 will tokenize telemetry data prior to being sent to the server-side validation manager 106. The tokenized telemetry data does not include any PII or information from which PII can be derived. Tokenized telemetry data only contains information relevant to ML model training, such as numerical values in a non-labelled array.

In some examples, the client-side model validator 312 validates the telemetry data it receives. The benefit of deploying ML models in a client cloud (e.g., the example client cloud 104 of FIG. 1) as a part of a federated learning framework is the ability to access complete telemetry data while still testing that data on models that are updated with global model data. In some examples, telemetry data is run through relevant models accessed by the client-side model validator 312 from the client model repository 309 and the outputs of the models are compared to ground truth data, similar to the validation process of validating the client models. In this case however, the models have already been validated and are known to be valid. Therefore, any telemetry that represents a potential security threat can be identified and detected.

An error function (e.g., mean square error (MSE), root MSE (RMSE), etc.) or any other function that can determine an accuracy value is utilized by the client-side model accuracy calculator 314 to determine the accuracy of the model outputs. The determined accuracy value is compared to a configured threshold. The accuracy function and/or threshold value may be the same as or different from the accuracy function and/or threshold value used for model validation. For example, a model accuracy threshold may be lower compared to the accuracy threshold of testing telemetry data to allow models to continue to update whereas a much lower tolerance may be desired for potential security threats. In some examples, when the accuracy value is below the accuracy threshold, a security response is generated by the client reporting manager 306. The example response includes, but is not limited to, an instruction (e.g., shut down local network, cut off connection to device, etc.), an alert (e.g., notification of detection, information about how to remedy security detection) and/or any other response to help an entity understand and/or remedy the situation. The example client reporting manager 306 sends the security response to the network gateway attached (e.g., the example network gateway 111 of FIG. 1) of which the security threat originated from. In some examples, the accuracy value is above the configured accuracy threshold, therefore validating the tested telemetry data. In some examples, validated telemetry data is stored and labeled as ground truth data in the client local data storage 108. The validated data may also be tokenized and sent to the server-side validation manager 106 to be stored as ground truth data in the server data storage 109.

As mentioned above, the example client reporting manager 306 reports model updates to the server-side validation manager 106. In some examples, the client reporting manager 306 sends requests to the server-side validation manager 106 for global model updates, training instructions, validation updates, and/or validation tasks. A global model update may be requested if a local model has been determined (by the example client-side model validator 312) to be poisoned, for example. A training instruction may be requested if a model is determined to be invalid, or if retraining is desired, for example. A validation update may be requested if a local model has been determined to be invalid any number of times (e.g., a threshold number of instances of invalid metrics) after retraining or if the client validator determines an update is necessary, for example. In some examples, the client reporting manager 306 requests the server-side validation manager 106 to validate a model using ground truth data stored in the example server data storage 109. The client reporting manager 306 may also request ground truth data stored in the example server data storage 109 to be sent to the example client cloud 104 that hosts it, so the local ground truth data can be updated. Further, as mentioned above, the client reporting manager 306 may produce security responses after a telemetry data validation step if the telemetry data was found to be a potential threat. The example response includes, but is not limited to, an instruction (e.g., shut down local network, cut off connection to device, etc.), an alert (e.g., notification of detection, information about how to remedy security detection) and/or any other response to help an entity understand and/or remedy the situation. The example client reporting manager 306 sends the security response to the network gateway attached (e.g., the example network gateway 111 of FIG. 1) of which the security threat originated from. Additionally, the example client reporting manager 306 may report to the server-side validation manager 106 tokenized validated telemetry data to be stored and used as new ground truth data.

Figure 4:
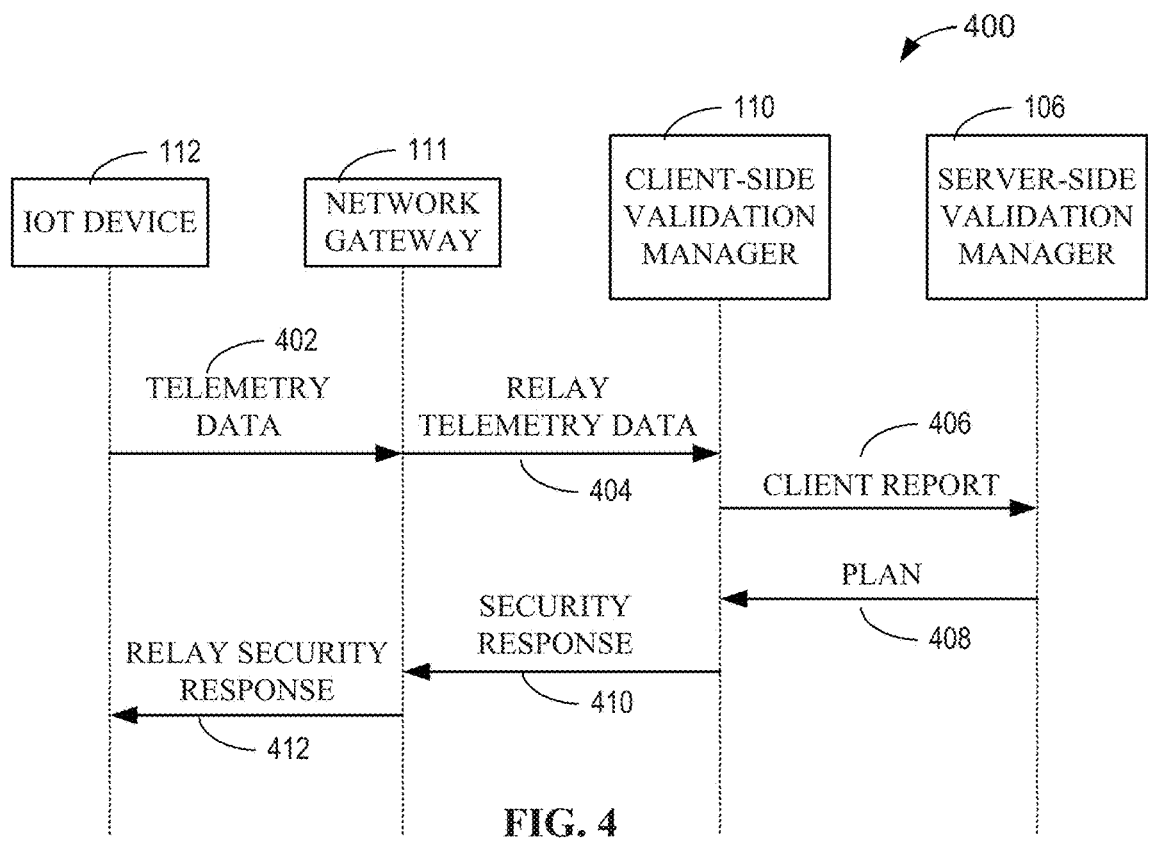
FIGS. 4 and 5 illustrate example data flows between an example device on a network and the server-side validation manager.

FIG. 4 illustrates an example data flow 400 of a client network in the privacy preserving system of FIG. 1. The illustrated example of FIG. 4 includes the example IoT device 112, the example network gateway 111, the example client-side validation manager 110, the example server-side validation manager 106, example telemetry data 402 (created by the example IoT device 112), example relayed telemetry data 404, an example client report 406, an example plan 408, an example first security response 410, and an example second security response 412. In operation, the example IoT device 112 produces telemetry data 402 (e.g., UPnP, mDNS, DNS, IP flow data, TLS metadata, etc.) which is collected while, for example, connected to and surfing the internet (e.g., through sending site requests, download information, site information, etc.). Additionally, the example telemetry data 402 can include device identification information or any other information about a device. The example telemetry data 402 is sent to the network gateway 111 which relays the telemetry data (e.g., the example relayed telemetry data 404) to a client cloud (e.g., the example client cloud 104 of FIG. 1), and more specifically the example client-side validation manager 110. In some examples, telemetry data 402 is collected at the network gateway 111 and is relayed to the client-side validation manager 110 as packaged telemetry data. The telemetry data 402 may also be reformatted and/or communicated to the cloud with a different protocol. In some examples, the client-side validation manager 110, once telemetry data is received, parses the information, and stores it in a way that is useful for processing.

In some examples, the client-side validation manager 110 requests tasks from the server-side validation manager 106. These requests are sent in a client report (e.g., the example client report 406) and may be related to training models, updating models, validating models, updating validation parameters, and/or any other request that may be related to the client. Additionally, client reports 406 may include model updates for the server-side validation manage 106 to update the relevant global model.

In response to a report 406, the server-side validation manager 106 sends a plan 408 to the client-side validation manager 110. The example plan 408 includes, but is not limited to, instructions and/or parameters (e.g., model parameters, and/or validation parameters. For example, the plan 408 may include an ML model configuration (e.g., model weights, number of neural network (NN) layers and/or an activation function), training parameters for that model (e.g., epoch and/or batch size), and/or a periodicity defining how often the model should be trained as well as how often a client-side validation manager 110 should communicate to the server-side validation manager 106. In some examples, the plan 408 sends validation value updates and/or telemetry data that was stored in the server data storage 109 of FIGS. 1 and 2 to the client-side validation manager 110. Additionally, the client-side validation manager 110 and server-side validation manager 106 can communicate any desired information between each other through the report 406 and plan 408.

Models on the client side are trained for any number and/or type of purpose corresponding to network security (e.g., anomaly detection, IoT device detection, identifying malicious flows, etc.). At least one benefit of having ML models in a client's cloud is that security solutions can be provided without sending telemetry data to a third-party network security provider. In some examples a server is utilized for receiving model updates and/or tokenized telemetry data from any number of clients to build global models. This framework also allows for the ability to validate models and/or telemetry data on at least two separate instances, thereby providing a safer network for subscribed entities. In some examples, telemetry data is run through relevant models on the client side and a security response (e.g., the security response 410) is generated if the output(s) of the model(s) do not meet an acceptable accuracy threshold. For example, the telemetry data 402, 404 may include, but is not limited to, an unidentified IoT device, malicious flows, and/or anomaly data. The example security response 410 is sent to the network gateway 111. In some examples, the security response 410 includes an instruction (e.g., shut down local network, cut off connection to device, etc.), an alert (e.g., notification of detection, information about how to remedy security detection) and/or any other response to help an entity understand and/or remedy the situation. In some examples, the network gateway 111 relays the security response (e.g., with the security response 412) to the relevant IoT device or other computing devices. In still other examples, remedial actions are performed by the example network gateway 111 to, for instance, block further communication(s) to the relevant IoT device. The network gateway may also act based on the security response 410 that it receives from the client-side validation manager 110. In some examples, the network gateway 111 is an edge device that contains a network security provider's software, hardware, and/or firmware (e.g., the example secure home gateway 113 of FIG. 1). In some examples, the security response is displayed on a user interface (UI) that can be accessed via a fixed device and/or any device with permission.

Figure 5:
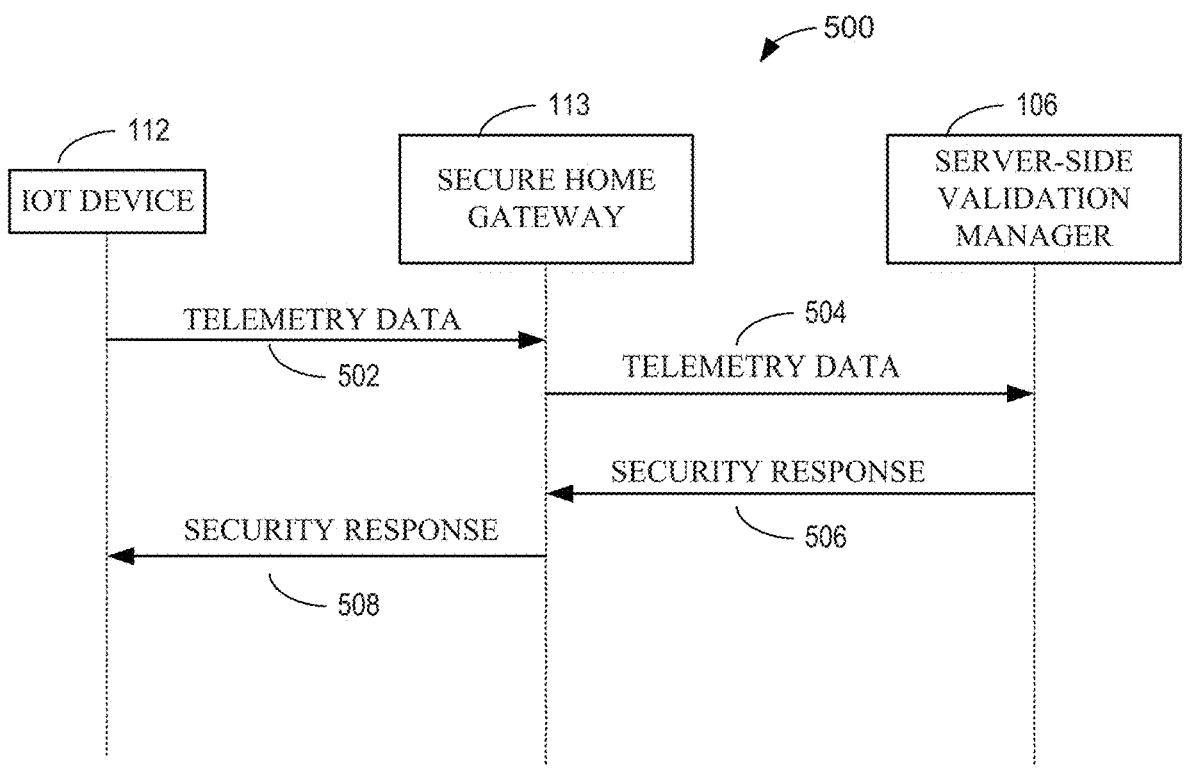

FIG. 5 illustrates an example data flow 500 of an client network in the privacy preserving system of FIG. 1. The illustrated example of FIG. 5 includes, an example IoT device 112, an example secure home gateway 113, an example server-side validation manager 106, example telemetry data 502, example relayed telemetry data 504, an example security response 506, and an example relayed security response 508. In some examples, a user subscribes to a third-party network security provider (e.g., McAfee) and consents to the use of the monitoring and sending of their telemetry data for security purposes to that security provider. By doing so, telemetry data (e.g., the example telemetry data 502) can be relayed directly from a network gateway (e.g., the example secure home gateway 113) to the network security provider's server cloud (e.g., the example server cloud 102 of FIG. 1) and more specifically, the server-side validation manager 106 that exists in that cloud. Note that in this example telemetry data is authorized to be released and/or otherwise provided to the example server-side validation manager, unlike the examples described above in connection with FIG. 4. In some examples, the user purchases or is given, as part of the subscription, a home gateway that contains the network security provider's hardware, software, and/or firmware (e.g., the example secure home gateway 113) that can collect telemetry data 502 and send that information to the server-side validation manager directly without going through the cloud network of a service provider (e.g., an ISP). By doing so, the user's data is no longer subject to the data and communication constraints that an Internet provider might apply. Additionally, the secure home gateway 113 may allow users to enter and/or label data through a user interface (UI) or otherwise, providing potential ground truth data to the server-side validation manager 106 and subsequentially, to other client networks as well. In some examples, a user is not subscribed to a third-party network security provider, rather the internet provider of the user is subscribed. In this case, user's telemetry data may be sent to their internet provider's cloud and then relayed to the server-side validation manager 106 with or without tokenization.

In some examples, the relayed telemetry data 504 arrives at the server-side validation manager 106 and is processed (e.g., parsed for relevant information). The example relayed telemetry data 504 may or may not be labeled and must be validated prior to saving the data for future training and/or ground truth data. The processed data is validated by being entered into relevant models and comparing, using an accuracy function (e.g., MSE, RMSE, or any other function that can determine an accuracy value.), the outputs to ground truth outputs stored in the server cloud. The accuracy value is compared against a configured threshold. If above the threshold, the data is valid and is labeled as such to be stored for future training and/or to be used as future ground truth data. If below the threshold, the data is invalid and is labeled as such to be stored for potential training of global models and/or to be sent to a client-side validation manager (e.g., the example client-side validation manager 110 of FIG. 1). In some examples, if the data is determined to be invalid, a security response 506 is sent from the server-side validation manager 106 back to the user's network. The users gateway (e.g., the example secure home gateway 113) will receive the security response and may perform and instruction that was sent in the response and/or relay the security response (e.g., the example relayed security response 508) to any number of IoT devices 112 on the network. In some examples, the security response 506 includes an instruction (e.g., shut down local network, cut off connection to device, etc.), an alert (e.g., notification of detection, information about how to remedy security detection) and/or any other response to help an entity understand and/or remedy the situation.

While an example manner of implementing the privacy preserving system 100 of FIG. 1 is illustrated in FIGS. 1-3, one or more of the elements, processes and/or devices illustrated in FIGS. 1-3 may be combined, divided, rearranged, omitted, eliminated and/or implemented in any other way. Further, the example server-side coordinator 202, the example data aggregator 204, the example server-side training manager 206, the example server-side model validator 210, the example server-side model accuracy calculator 212, the example server model repository 208, the example server data storage 109 the example telemetry data manager 302, the example client configuration manager 304, the example client reporting manager 306, the example client task manager 308, the example client training manager 310, the example client validator 312, the example client-side model accuracy calculator 314, the example client model repository 309, the example local client data 108 and/or, more generally, the example server-side validation manager 106 and/or the example client-side validation manager 110 of FIG. 1-3 may be implemented by hardware, software, firmware and/or any combination of hardware, software and/or firmware. Thus, for example, any of the example server-side coordinator 202, the example data aggregator 204, the example server-side training manager 206, the example server-side model validator 210, the example server-side model accuracy calculator 212, the example server model repository 208, the example server data storage 109 the example telemetry data manager 302, the example client configuration manager 304, the example client reporting manager 306, the example client task manager 308, the example client training manager 310, the example client validator 312, the example client-side model accuracy calculator 314, the example client model repository 309, the example local client data 108 and/or, more generally, the example server-side validation manager 106 and/or the example client-side validation manager 110 of FIG. 1-3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example server-side coordinator 202, the example data aggregator 204, the example server-side training manager 206, the example server-side model validator 210, the example server-side model accuracy calculator 212, the example server model repository 208, the example server data storage 109 the example telemetry data manager 302, the example client configuration manager 304, the example client reporting manager 306, the example client task manager 308, the example client training manager 310, the example client validator 312, the example client-side model accuracy calculator 314, the example client model repository 309, the example local client data 108 and/or, more generally, the example server-side validation manager 106 and/or the example client-side validation manager 110 of FIG. 1-3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example privacy preserving system of FIG. 1 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the privacy preserving system 100 of FIGS. 1-3 are shown in FIG. 6-14. The machine readable instructions may be one or more executable programs or portion(s) of an executable program for execution by a computer processor such as the processor 1512 shown in the example processor platform 1500 discussed below in connection with FIG. 15. The program(s) may be embodied in software stored on a non-transitory computer readable storage medium such as a CD-ROM, a floppy disk, a hard drive, a DVD, a Blu-ray disk, or a memory associated with the processor 1512, but the entire program(s) and/or parts thereof could alternatively be executed by a device other than the processor 1512 and/or embodied in firmware or dedicated hardware. Further, although the example program is described with reference to the flowcharts illustrated in FIG. 6-14, many other methods of implementing the example privacy preserving system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
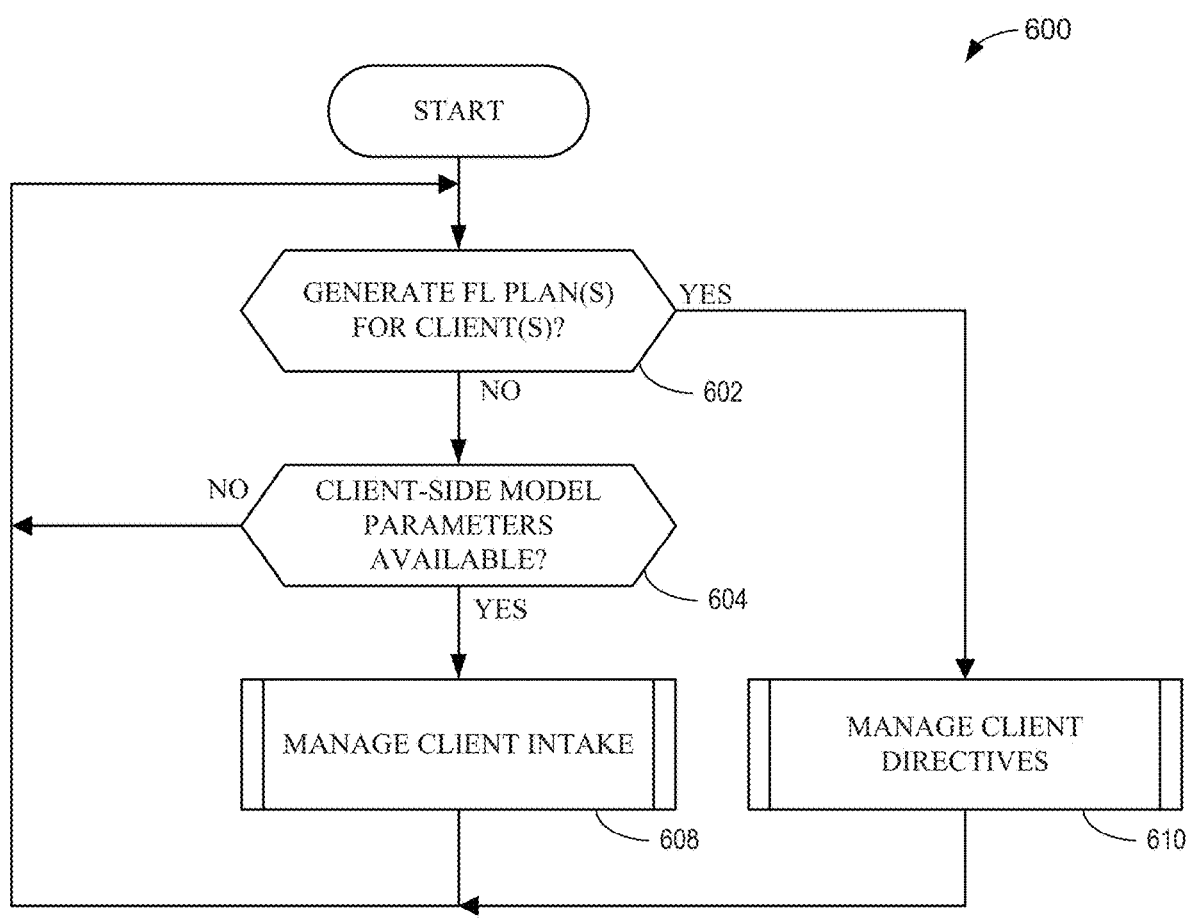
FIGS. 6-9 are flowcharts representative of example machine readable instructions which may be executed to implement the server-side validation manager of FIGS. 1 and 2.

The program 600 of FIG. 6 includes block 602, in which the example server side coordinator 202 determines whether to generate a federated learning (FL) plan for one or more ISP clients. If so, control advances to block 610 where the example server side training manager 206 processes and/or otherwise manages client directives, as described in further detail below. In some examples, control advances to block 610 in response to the server side coordinator 202 retrieving, receiving and/or otherwise detecting one or more client devices joining a service for device protection. This may occur at the request of an ISP corresponding to the device, in which the ISP is interested in maintaining an acceptable degree of security for its customers and their devices.

In the event there is no current need to generate federated learning (FD) plans for one or more ISP clients (block 602) (e.g., there have been no client notifications or requests to participate in model development activities), the example data aggregator 204 determines whether client-side model parameters are available (block 604). If not, then control returns to block 602 to continue monitoring for client-side activity, otherwise the example data aggregator manages client intake of model parameters (block 608), as described in further detail below.

Figure 7:
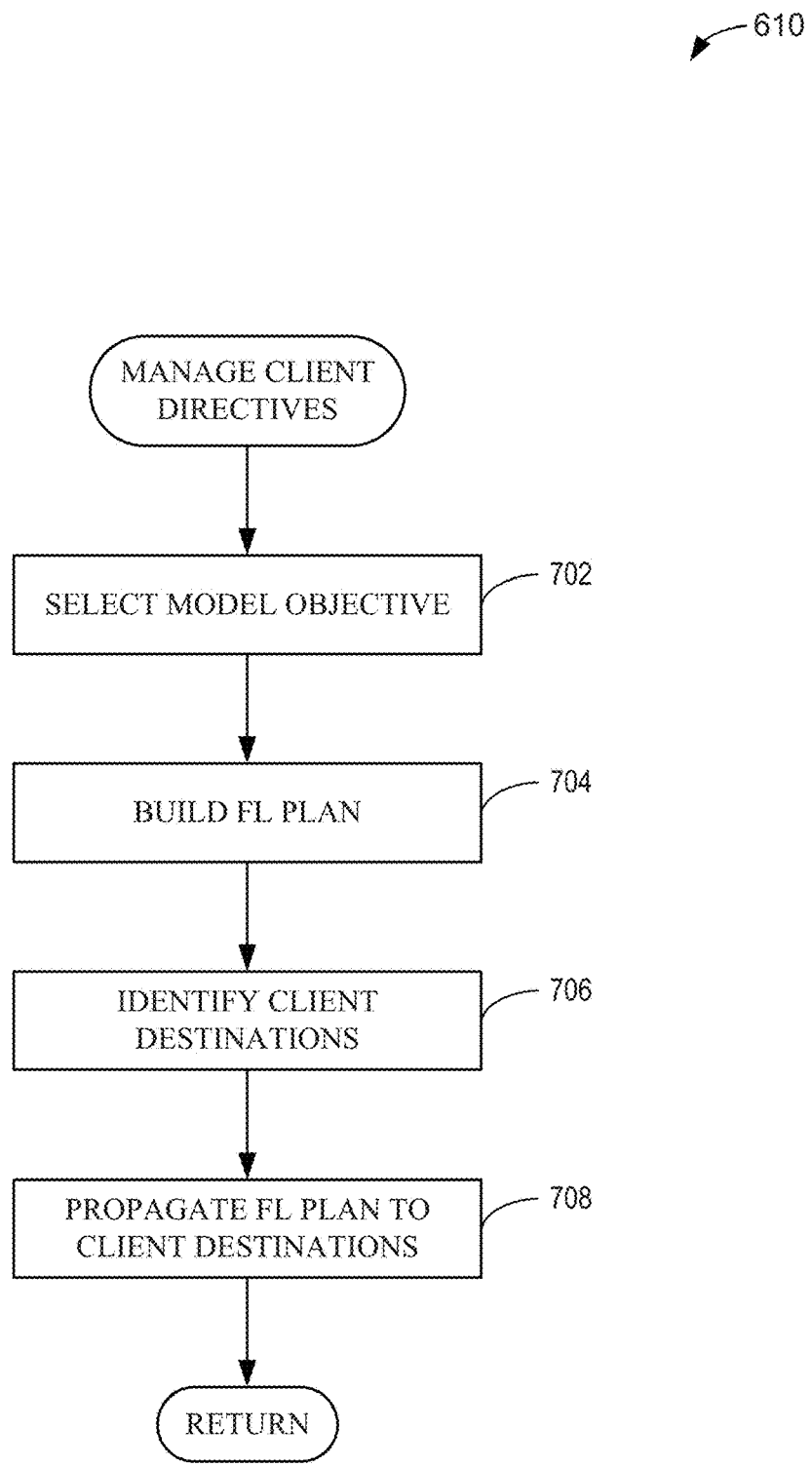

As disclosed above, in the event one or more clients needs an FL plan (block 602), the example server-side training manager 206 manages one or more client directives (block 610). FIG. 7 illustrates additional detail corresponding to managing client directives (block 610). In the illustrated example of FIG. 7, the example server-side training manager 206 selects a model objective (block 702). Generally speaking, model development corresponds to a particular objective (e.g., an ML application) with which the model is to perform such as, but not limited to, device identification tasks or malware detection tasks. The example server-side training manager 206 builds an FL plan (block 704) that includes instructions for one or more clients of the requesting ISP. The FL plan ensures global synchronization (e.g., a transmission schedule to cause client-side devices to transmit updates in a manner consistent with a schedule, a transmission schedule that identifies a target epoch, a transmission schedule that identifies a target number/quantity of training samples) of ML models and facilitates training and evaluation rounds in lockstep. The FL plan includes a global model to serve as a starting point for client devices that have not yet begun to contribute to model building efforts, and includes one or more configurations related to a periodicity with which to contact the server with updates. Model structure information within the FL plan is typically realized as a graph, such as a deep neural network (DNN) model configuration having information corresponding to the model structure (e.g., a number of layers, activation function(s), etc.). The model structure information may also include functions related to pre-processing of data that are needed for transformation prior to training activities.

An example FL plan generated and/or otherwise built by the server-side training manager 206 includes a string of information, an example of which is shown in Equation 1.

$$FL\ Plan=[\{Global\ Model, Model\ config, data\ selection\ criterion\}, \{aggregation\ server, aggregation\ criterion, periodicy\}]\quad\text{Equation 1.}$$

In the illustrated example of Equation 1, Global Model represents parameters corresponding to a global model to be distributed to the client device, Model config represents details corresponding to model configuration parameters (e.g., number of layers, activation functions, etc.), data selection criterion represents one or more functions to select data for model training (e.g., telemetry data (fingerprint data) having device identification labels, labelled TLS telemetry data, parameters for model training, etc.), aggregation server represents address information and/or access credentials to which updates can be sent, aggregation criterion represents federated average information, secure aggregation information, etc., and periodicity represents a frequency with which clients should report back to the server(s) with anonymized parameter model data.

Periodicity of execution of any ML task is a function of the particular ML application being trained or validated and a data collection frequency for the individual clients or client ISPs. Depending on the type of ML task, the periodicity may be executed hourly, daily, weekly or any other desired frequency. Additionally, because clients behave in a manner consistent with any established periodicity value, communication efforts are coordinated to avoid surprise and/or otherwise random bandwidth issues/behaviors.

The example server-side training manager 206 identifies client destinations for the example FL plan (block 706). Example client destinations include a list of candidate or otherwise available ISP client devices that subscribe to a service corresponding to the ML task (e.g., malware detection, device identification, etc.). The list of client destinations may be dynamic, such that new devices/members are routinely being added or dropped from the ML tasks (e.g., in view of an ebb/flow of ISP subscribers joining/leaving the ISP). In some examples, the FL plan includes some updated parameters, but leaves other aspects of the plan alone. For instance, first-time clients may receive an FL plan with the global model that is to be utilized and/or otherwise executed by those clients. On the other hand, for those clients that have been operating for some time the global model is either omitted from the FL plan, or the client devices ignore implementation of the global model unless a corresponding flag indicates that the global model should overwrite one or more local models of the client device. The example server-side training manager 206 then propagates the FL plan to identified client destinations (block 708). In some examples, the server-side coordinator 202 tokenizes model parameters to be sent to the client-side to anonymize and/or otherwise cause the model parameters to be devoid of telemetry label information (e.g., tokenized model parameters) (e.g., information identifying a particular device model, a device type, etc.).

Figure 8:
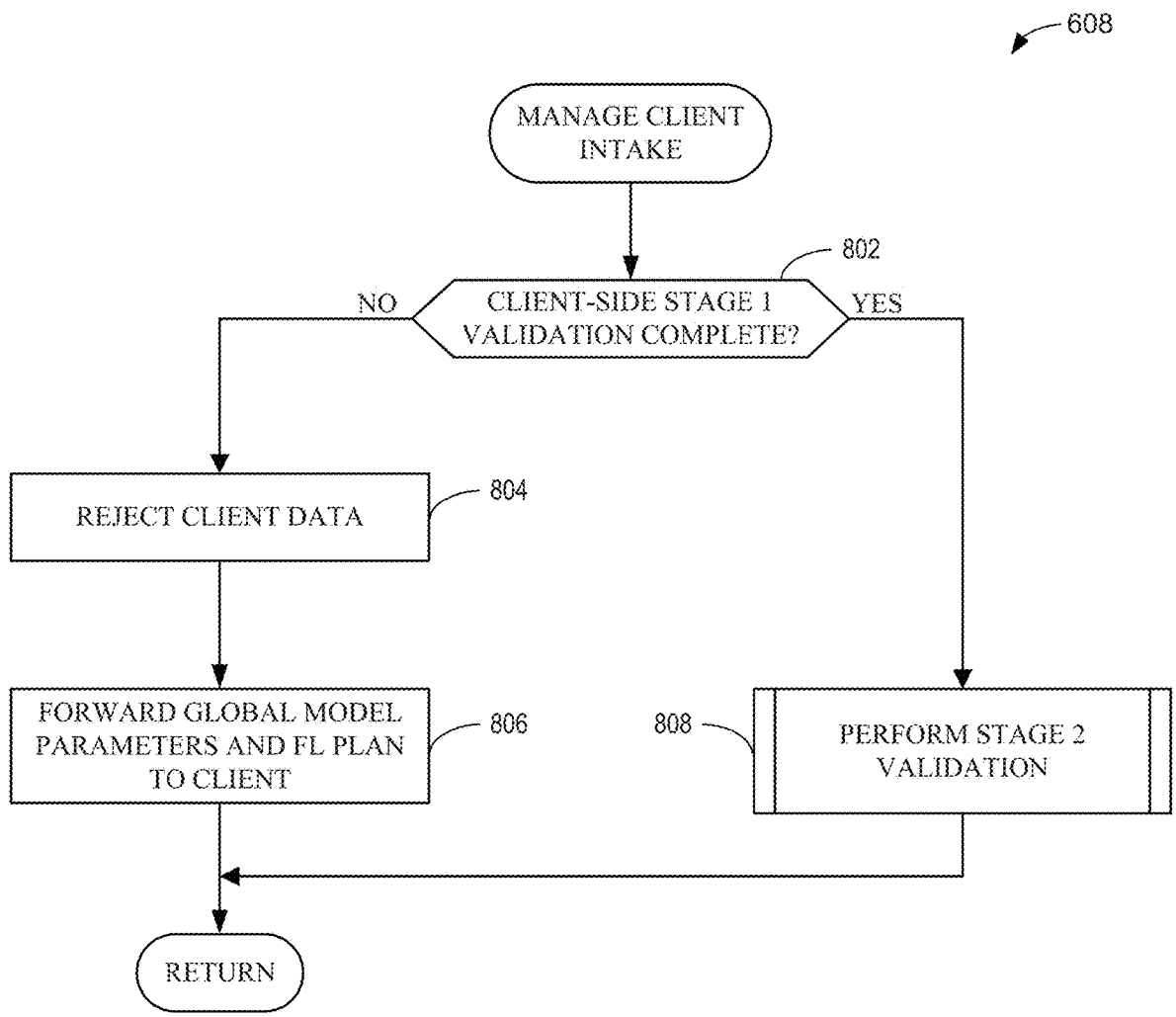

Returning to the illustrated example of FIG. 6, in the event the example data aggregator 204 determines that client-side model parameters are available, then it manages client intake activities (block 608). FIG. 8 illustrates additional detail associated with managing client intake of FIG. 6. In the illustrated example of FIG. 8, the data aggregator 204 determines whether client-side stage 1 (e.g., a first validation phase/tier, a primary validation, etc.) validation has been completed (block 802). In some examples, the data aggregator 204 evaluates and/or otherwise searches incoming data from a particular client for a flag (e.g., a primary validation flag) and/or other indication that stage 1 validation has occurred. In the event such an indication is detected by the example data aggregator 204, the example server-side model validator 210 performs a stage 2 validation (block 808) (e.g., a secondary validation phase), as described in further detail below.

However, in the event the example data aggregator 204 receives client data (e.g., client-side modeling parameters) that does not include an indication of stage 1 validation having been performed (block 802) (e.g., the received model parameters do not include a stage 1 validation flag), the example server-side model validator 210 rejects the client data (block 804) for having failed a proper integrity check. In most circumstances, the example data aggregator 204 should not have ever received client-side data if stage 1 validation did not already occur, but the example process 608 of FIG. 8 protects against instances where such stage 1 validation safeguards have been circumvented. For instance, if a client-side device has been circumvented and the client-side data has been released without stage 1 validation occurring, then the example process 608 of FIG. 8 identifies such circumstances and rejects the client data (block 804). In some examples, while the client-side data is rejected for purposes of aggregation and/or otherwise bolstering efforts of the global model, the potentially malicious client-side data may be retained for alternate purposes. In particular, the potentially malicious client-side data may be further analyzed to study one or more emerging poisoning efforts from client-side devices.

Once this circumvention has been detected by the example data aggregator 204, the example server-side training manager 206 forwards global model parameters and a corresponding FL plan to the suspect client-side device. Stated differently, because the client-side device has an indication of foul-play (e.g., an adversarial attack of the client device), the server-side training manager 206 provides that client device with a fresh FL plan and global model to avoid further use of a local model that may have been tampered with.

Adversarial attacks may include poisoning and/or evasion attacks, which are intended to adversely affect detection and prediction capabilities of ML models (e.g., ML models that target security solutions). In some examples, a relatively small number of malicious adversaries affect a local model. If a federated learning topology propagates the affected local model, then a corresponding global model that is built-upon or otherwise derived from one or more local models becomes compromised and/or otherwise less effective. Localized adversarial attacks may attempt to misclassify certain inputs (e.g., for ML tasks associated with device identification) such that model parameters returned to a server (e.g., for cultivation and updating of a global model) reduce the efficacy of the global model. After the server-side model validator 210 rejects the client data (block 804), the example server-side training manager 206 forwards the new global model (e.g., the parameters of the global model) and a new FL plan to the suspect client device (block 806).

Figure 9:
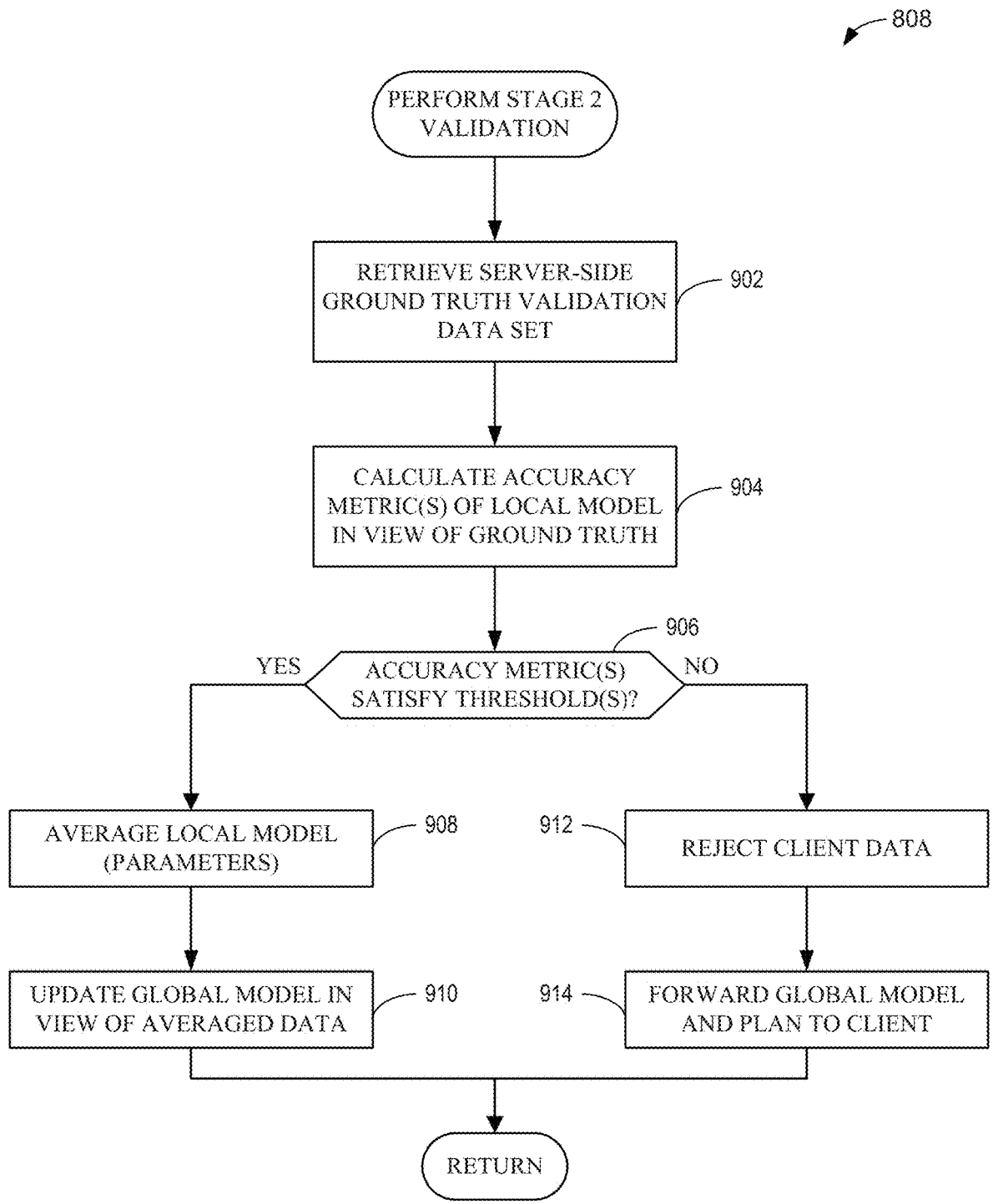

FIG. 9 illustrates additional detail corresponding to executing a stage 2 validation (e.g., secondary validation) corresponding to block 808 above. In the illustrated example of FIG. 9, the server-side model validator 210 retrieves at least one server-side ground truth validation data set (block 902). In some examples, the server-side ground truth validation data set is derived and/or otherwise built by an ISP and/or built by a security provider (e.g., McAfee®).

Example validation data sets created by either trusted entity may be shared therebetween and may include known devices (e.g., ground truth) such that the validation data set is labelled. Validation data sets are stored in the example server model repository 208, the example server data storage 109, and/or in trusted execution environments to avoid any malicious access of validation criterion.

The example server-side model validator 210 retrieves server-side ground truth data set(s) (block 902) (e.g., from a trusted execution environment (TEE)), and the example server-side model accuracy calculator 212 calculates accuracy metrics of retrieved local model parameters in connection/comparison with ground truth data (block 904). In some examples, localized client-side models may perform a number of epochs of training that results in relatively high accuracy models and, as such, perform better than global models. The example server-side model accuracy calculator 212 calculates accuracy metrics of the client-side model parameter data (block 906), and if one or more accuracy thresholds is satisfied, the local model parameters are averaged (block 908). The example server-side model validator 210 updates and/or otherwise authorizes the updating of the global model in connection with the averaged parameter data in an effort to improve the overall efficacy of the global model (block 910), and control returns to block 602 of FIG. 6.

However, in the event the example server-side model accuracy calculator 212 determines that calculated accuracy metrics of the client-side model parameters do not satisfy one or more accuracy thresholds (block 906), then the example server-side model validator rejects the client-side data (block 912) as failing to exhibit a requisite degree of quality or accuracy. Stated differently, the example accuracy calculator 212 prohibits any updates to the global model when results of the secondary validation do not satisfy the validation threshold(s). In some examples, further iterations or epochs on the client side are needed to build the model such that it behaves in a manner that satisfies accuracy metrics. In some examples, despite a relatively high iteration/epoch count, the client-side model still fails to satisfy accuracy metrics. In such circumstances where further iterations/epochs are not expected to improve the performance of the client-side model, the example server-side training manager 206 may, in some examples, force a client device to start over and forward the global model and an updated FL plan to the client (block 914). However, in some circumstances model retraining may not be initiated unless a threshold number of client model parameters are rejected. Stated differently, the example training manager 206 causes, in some example circumstances, the client-side resources to execute a second/alternate modeling plan instead of an original/first modeling plan. Ultimately, updating of the global model will not occur unless conditions indicate it is safe to do so. Control then returns to block 602 of FIG. 6.

Figure 10:
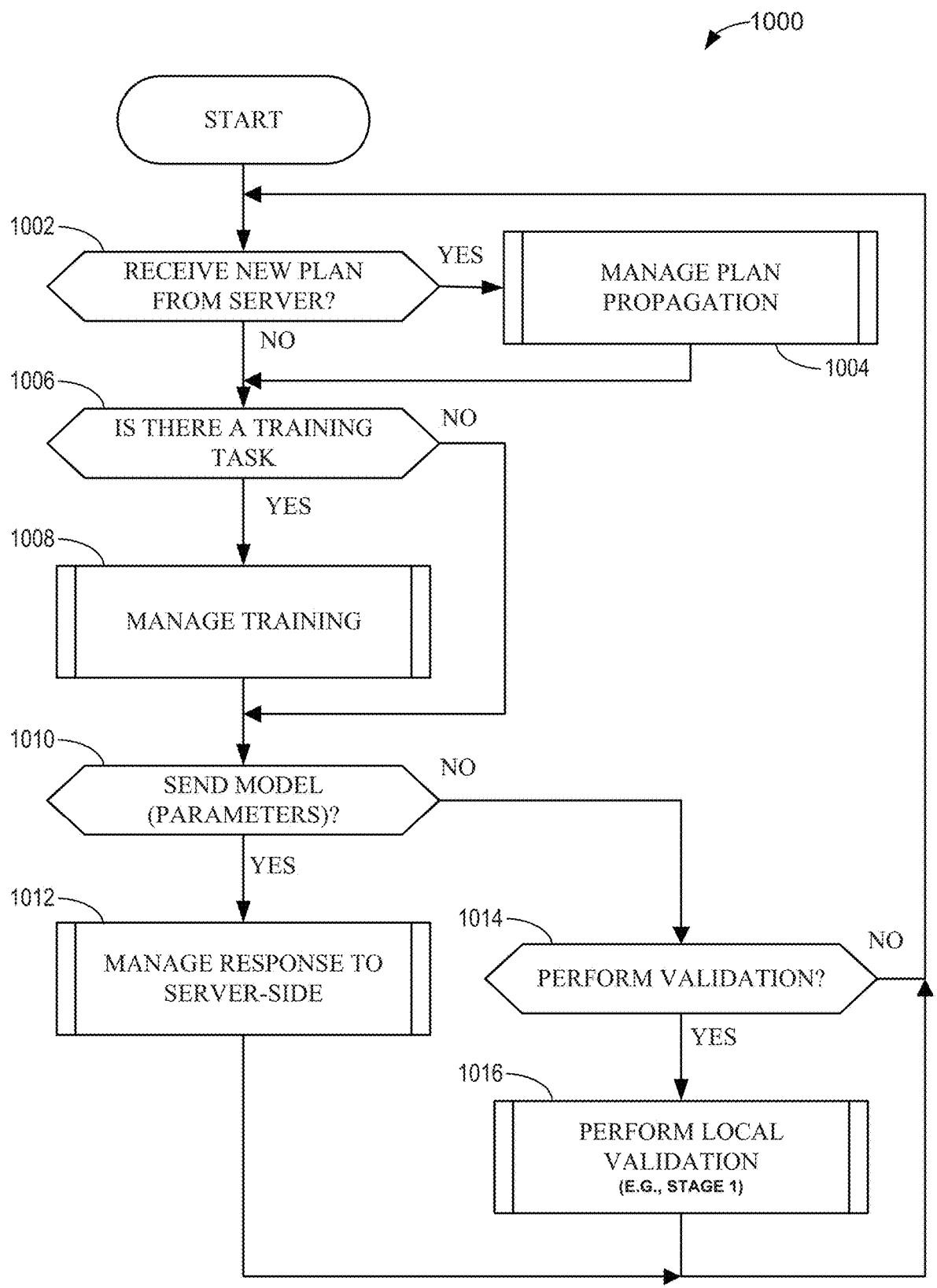
FIG. 10-14 are flowcharts representations of example machine readable instructions which may be executed to implement the client-side validation manager of FIGS. 1 and 3.

FIG. 10 is a flowchart representative of example hardware logic, machine readable instructions, hardware implemented state machines, and/or any combination thereof for implementing the client-side of the example privacy preserving system 100 of FIGS. 1-3. In the illustrated example of FIG. 10, the example client configuration manager 304 monitors for communication from the server-side (e.g., the example server-side validation manager 106) to determine whether a new plan has been received (block 1002). If so, then the example client configuration manager 304 updates the client-side modeling efforts in a manner consistent with that plan (block 1004) as described in further detail below.

After the example client-side (e.g., the example client-side validation manager 110) is configured in a manner consistent with the plan sent by the server-side (block 1004), or if the client-side is already configured in a manner consistent with a previously-provided plan (block 1002), the example client training manager 310 determines whether there is a training task to be performed on the client side (block 1006). If so, the example client training manager 310 manages and/or otherwise performs the training task(s) (block 1008), as described in further detail below. Upon completion of the training task(s) (block 1008), the example client reporting manager 306 determines whether updated client-side model parameters should be sent to the server-side (block 1010). In some examples, the client reporting manager 306 determines that model parameters should be sent based on a threshold number of training iterations, a threshold number of epochs, a threshold amount of time since a prior set of model parameters was sent to the server-side, etc. If so, then the example client reporting manager 306 manages the response to the server side (block 1012) as described in further detail below.

The example client-side model validator 312 determines whether a client-side model validation should be performed (block 1014). In some examples, the client-side model validator 312 determines that validation should occur based on, for example, instructions from the plan. For instance, model validation may occur in response to a threshold number of model training iterations, a threshold amount of time, etc. If the example client-side model validator 312 determines that validation of one or more local models should occur (e.g., validation in connection with ground-truth data set(s)), then the example client-side model validator 312 performs local validation (block 1016), as described in further detail below.

Figure 11:
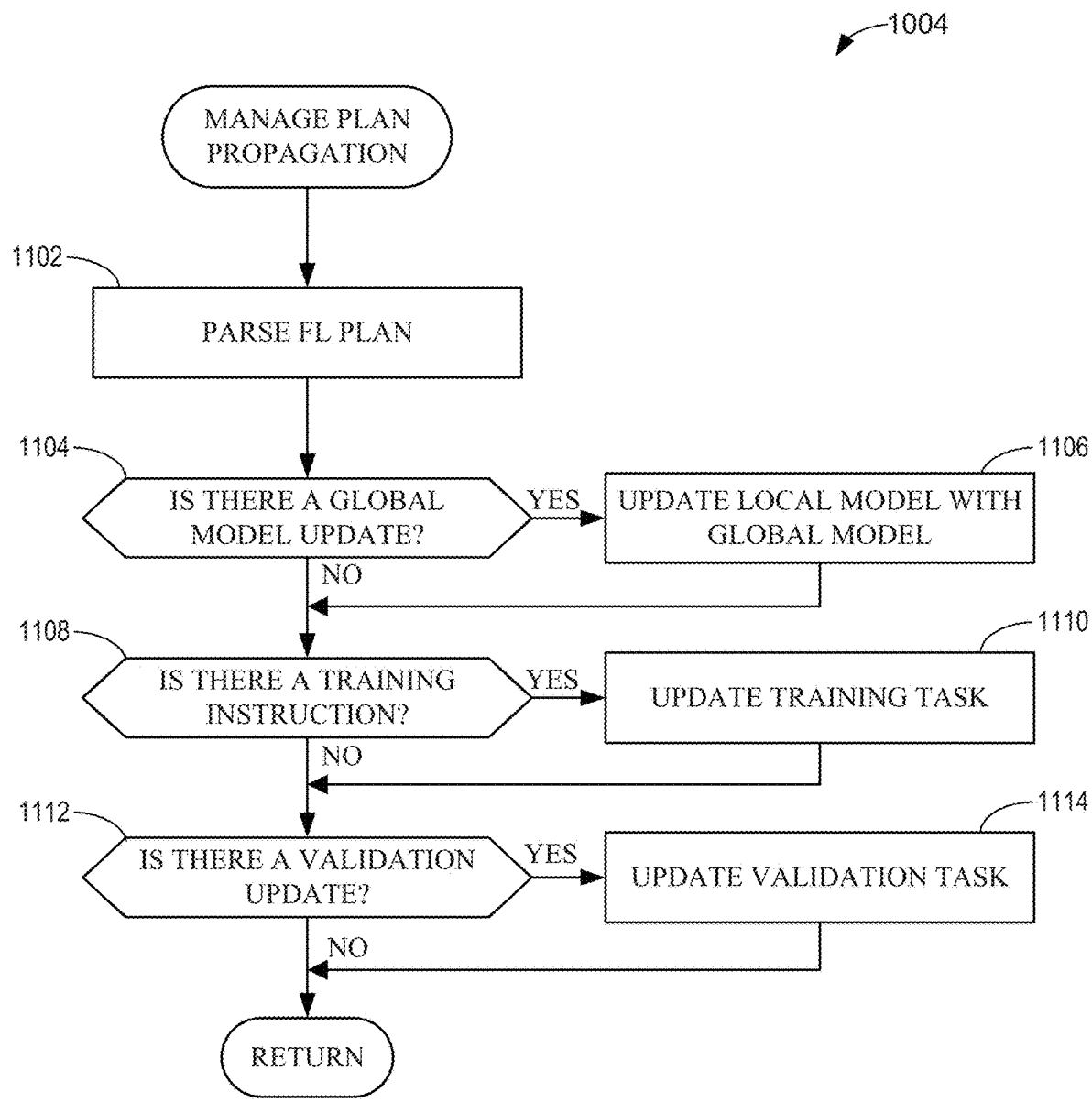

FIG. 11 illustrates additional detail in connection with example block 1004 above, where the example client configuration manager 304 manages plan propagation. In the illustrated example of FIG. 11, the example client configuration manager 304 parses the received and/or otherwise retrieved FL plan (block 1102). Generally speaking, the example plan may include any number of different groupings of data and/or instructions that cause the client-side validation manager 110 to operate in specific ways. As described above, the plan may dictate a type of modeling algorithm to apply, a number of nodes of a neural network to apply, a number of epochs, etc. The example client configuration manager 304 determines if the received plan includes an instruction to update the local model(s) of the client-side validation manager 110 with a received global model (block 1104). If such an instruction is detected, the example client configuration manager 304 updates and/or otherwise replaces the local model (e.g., model parameters devoid of PII) with the received global model (e.g., model parameters devoid of PII) (block 1106). However, in some examples the ISPs are afforded a great deal of latitude in selecting which model to use. Examples disclosed herein enable control by the ISPs to replace local models based on validation results. In such examples, the ISP or enterprise network validates the global model using one or more validation sets. Based on the performance of the global model, a selection of which model to deploy is enabled by examples disclosed herein. In the event that performance of the global model is better than the local model, then updates can occur by choice of the ISP (e.g., choose the local model, update the local model). Accordingly, ISPs enjoy the control and flexibility to determine a best possible model to deploy.

The example client training manager 310 evaluates the parsed FL plan to determine whether one or more training instructions are provided (block 1108). If so, the example client training manager 310 updates the client-side validation manager 110 with one or more updated training instructions (block 1110) (e.g., updated model evaluation/inference architectures, alternate number of model layers to utilize, etc.). The example client-side model validator 312 determines whether the provided and/or otherwise obtained FL plan includes a validation update (block 1112), such as updated instructions on the manner in which validation operations are to occur. If so, validation task instructions are updated (block 1114), such as instructions to utilize an alternate set of ground-truth data when performing validation operation(s). Control then returns to block 1006 of FIG. 10.

Figure 12:
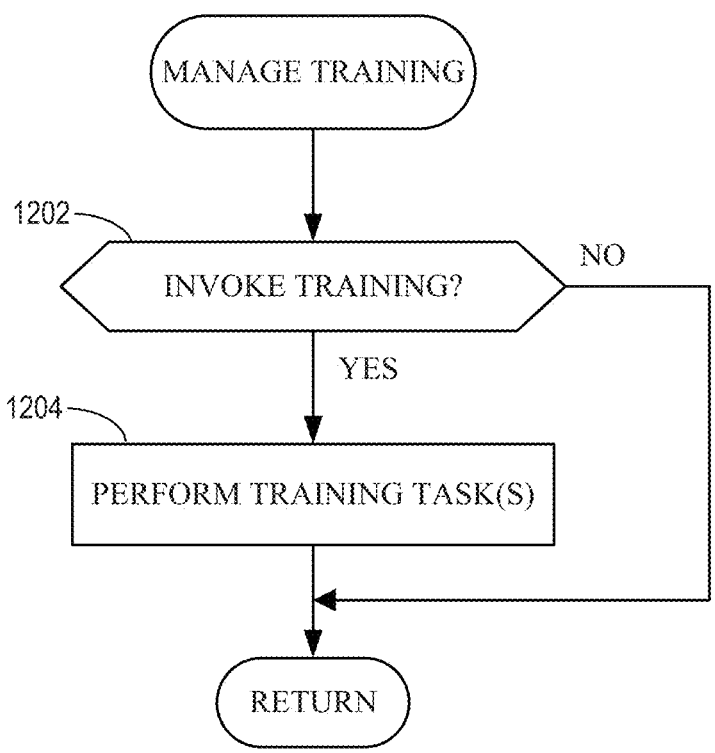

FIG. 12 illustrates additional detail in connection with example block 1008, where the example client training manager 310 manages and/or otherwise performs training tasks. In the illustrated example of FIG. 12, the example client training manager 310 determines whether one or more triggers have occurred indicative of a time to perform model training tasks (block 1202). Triggers may include, but are not limited to a threshold amount of time, a threshold quantity of accumulated data, etc.). If the one or more triggers are satisfied (block 1202), then the example client training manager 310 performs training tasks (block 1204), otherwise control returns to block 1010 of FIG. 10.

Figure 13:
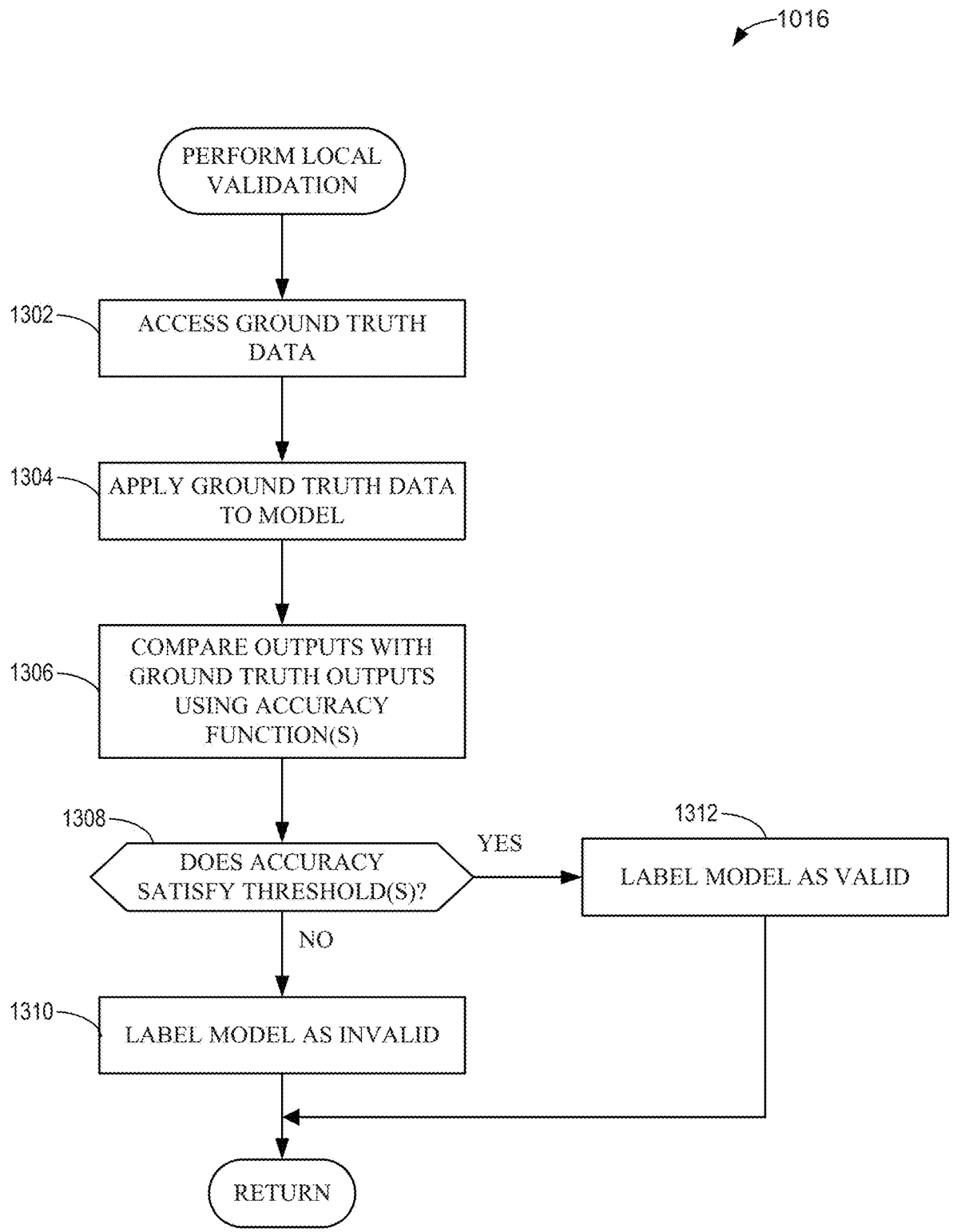

FIG. 13 illustrates additional detail in connection with example block 1016, where the example client-side model validator 312 initiates local validation tasks. In the illustrated example of FIG. 13, the example client-side model validator 312 accesses ground truth data (block 1302) (e.g., ground truth data provided during a prior FL plan update), and the example telemetry data manager 302 applies ground truth data as input(s) to the client-side model (block 1304). In some examples, the ground truth data (e.g., ground truth data sets) are stored in the example client model repository 309. The example client-side model accuracy calculator 314 compares model outputs with the ground truth output values using any number and/or type of accuracy function (block 1306). Additionally, the client-side model accuracy calculator 314 determines whether the comparison satisfies one or more accuracy thresholds (block 1308). If so, the local model is identified by the client side model validator 312 as a valid model and/or otherwise capable of satisfying its objective (block 1312) (e.g., detecting particular malware events, detecting particular device types, etc.). On the other hand, if the comparison does not satisfy the one or more accuracy thresholds (block 1308), then the example client side model validator 312 identifies the local model as invalid and/or otherwise inappropriate for further use (block 1310). As described above, the local model is then replaced with the global model. Control then returns to block 1002 of FIG. 10.

Figure 14:
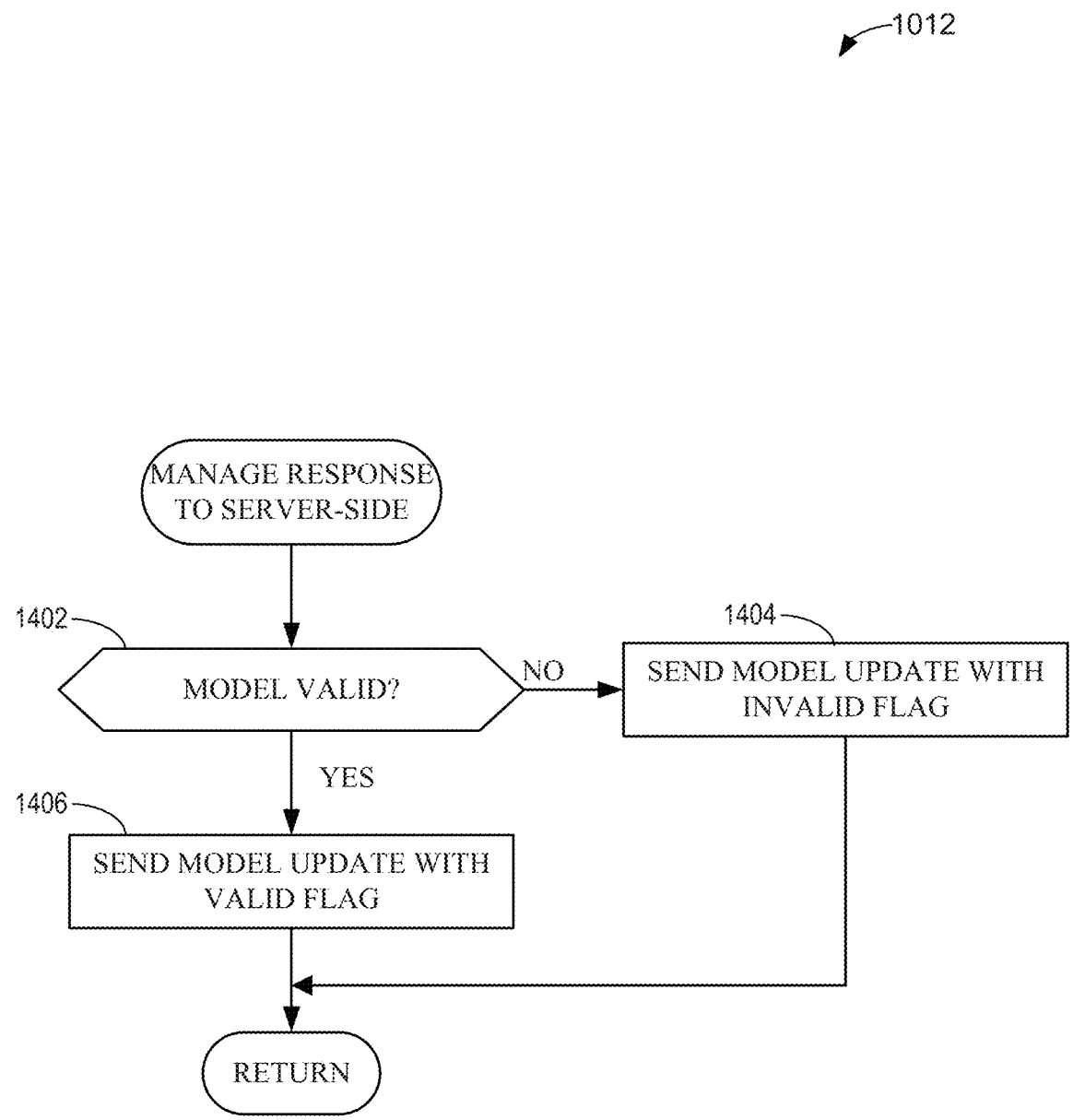

FIG. 14 illustrates additional detail in connection with example block 1012, in which the example client reporting manager 306 manages responses that should be provided to the server-side. As described above, any number of client-side validation managers in the field may perform their own localized model evaluation and training efforts, the best of which are returned to the server-side for aggregation in an effort to derive an improved global model. In the illustrated example of FIG. 14, the example client reporting manager 306 determines whether the model (e.g., model parameters devoid of PII) to be sent is valid or not (block 1402). If the model is not valid, thereby indicating poor performance or poisoning, the client reporting manager 306 provides and/or otherwise transmits the local model parameters with a flag indicative of invalidity (block 1404). In particular, despite the localized model lacking performance metrics deemed valid, such model parameters may be useful for further analysis on the server-side to identify instances of potential model sabotage. However, in the event the model is deemed valid (block 1402), then the example client reporting manager provides and/or otherwise transmits the local model parameters with a flag indicative of valid (block 1406). Control then returns to block 1002 of FIG. 10.

Figure 15:
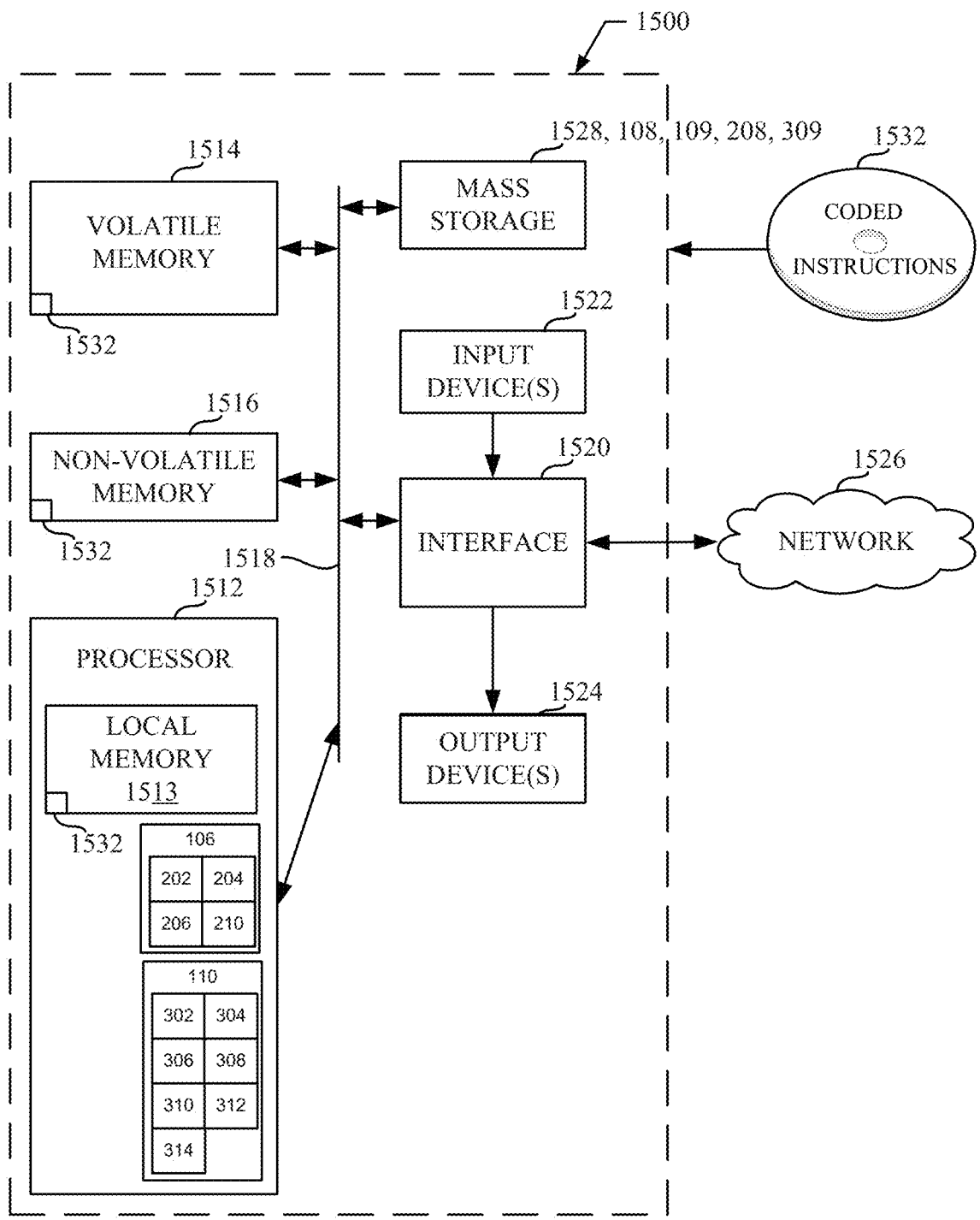
FIG. 15 is a block diagram of an example processing platform structured to execute the instructions of FIGS. 6-14 to implement the example server-side validation manager and example client-side validation manager of FIGS. 1-3.

FIG. 15 is a block diagram of an example processor platform 1500 structured to execute the instructions of FIGS. 6-9 to implement the apparatus of FIGS. 1 and 2, which correspond to server-side structure disclosed in FIG. 1. Additionally, FIG. 15 is a block diagram of an example processor platform 1500 structured to execute the instructions of FIGS. 10-14 to implement the apparatus of FIGS. 1 and 3, which correspond to client-side structure disclosed in FIG. 1. While a single instance of the example processor platform is discussed below, any number of separate instances of the example processor platform 1500 are realized in examples disclosed herein, without limitation. The processor platform 1500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements server-side structure including the example server-side coordinator 202, the example data aggregator 204, the example server-side training manager 206, the example server-side model validator 210, the example server-side model accuracy calculator, and the example server-side validation manager 106. Additionally, the processor 1512 implements client-side structure including the example telemetry data manager 302, the example client configuration manager 304, the example client reporting manager 306, the example client task manager 308, the example client training manager 310, the example client validator 312, the example client-side model accuracy calculator 314, and the example client-side validation manager 110.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 6-14 may be stored in the mass storage device 1528, in the volatile memory 1514, in the non-volatile memory 1516, and/or on a removable non-transitory computer readable storage medium such as a CD or DVD.

Figure 16:
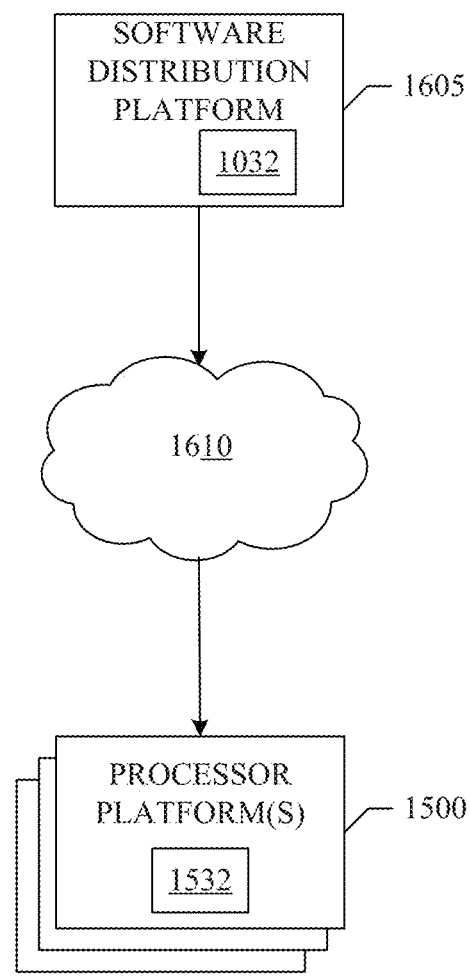
FIG. 16 is a block diagram of an example software distribution platform to distribute software (e.g., software corresponding to the example computer readable instructions of FIGS. 6-14) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1605 to distribute software such as the example computer readable instructions 1532 of FIG. 15 to third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1532 of FIG. 15. The third parties may be consumers, users, retailers, OEMs, etc., who purchase and/or license the software for use and/or re-sale and/or sub-licensing. In the illustrated example of FIG. 16, the software distribution platform 1605 includes one or more servers and one or more storage devices. The storage devices store the computer readable instructions 1532, which may correspond to the example computer readable instructions 1532 FIG. 15, as described above. The one or more servers of the example software distribution platform 1605 are in communication with a network 1610, which may correspond to any one or more of the Internet and/or any of the example networks 1610 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1532 from the software distribution platform 1605. For example, the software, which may correspond to the example computer readable instructions 1532 of FIG. 15 may be downloaded to the example processor platform 1500, which is to execute the computer readable instructions 1532 to implement the client-side structure (e.g., the structure of FIG. 3) or the server-side structure (e.g., the structure of FIG. 2). In some examples, one or more servers of the software distribution platform 1605 periodically offer, transmit, and/or force updates to the software (e.g., the example computer readable instructions 1532 of FIG. 15) to ensure improvements, patches, updates, etc. are distributed and applied to the software at the end user devices.

From the foregoing, it will be appreciated that example methods, apparatus and articles of manufacture have been disclosed that improve the efficacy of global models based on the best performance characteristics occurring at different client-side locations that perform model training and inferences. In the event new clients join a networked service provider to enjoy the benefits of network security (e.g., connected device identification, device network anomaly detection, etc.), such new clients can immediately receive a global model that has an improved performance capability. Additionally, because the server-side resources and the client-side resources implement federated learning techniques, sensitive and/or otherwise private client-side telemetry data is not shared with the server-side resources. Instead, model parameters developed and learned on client-side resources are tokenized as one or more sets of model parameters before being sent to the server-side resources for global model improvements.

Example methods, apparatus, systems, and articles of manufacture to build privacy preserving models are disclosed herein. Further examples and combinations thereof include the following:

Example 1 includes a computer system to update a global model, comprising a training manager to generate a first modeling plan for client-side resources, and transmit the first modeling plan to the client-side resources, a data aggregator to search for a primary validation flag in response to retrieving client-side model parameters, and an accuracy calculator to in response to detecting the primary validation flag, perform a secondary validation corresponding to the client-side model parameters using a server-side ground truth data set, and determine whether to update the global model with the client-side model parameters based on a comparison of results of the secondary validation and a validation threshold.

Example 2 includes the computer system as defined in example 1, wherein the accuracy calculator is to authorize updating of the global model when the results of the secondary validation satisfy the validation threshold.

Example 3 includes the computer system as defined in example 1, wherein the accuracy calculator is to prohibit updating of the global model when the results of the secondary validation do not satisfy the validation threshold.

Example 4 includes the computer system as defined in example 3, wherein the training manager is to send a second modeling plan to the client-side resources in response to rejecting the client-side modeling parameters, and cause the client-side resources to execute the second modeling plan instead of the first modeling plan.

Example 5 includes the computer system as defined in example 1, wherein the first modeling plan includes tokenized model parameters devoid of telemetry labels.

Example 6 includes the computer system as defined in example 1, wherein the first modeling plan includes a transmission schedule for the client-side resources.

Example 7 includes the computer system as defined in example 6, wherein the transmission schedule includes at least one of a target epoch, a quantity of training dataset iterations, or a quantity of training samples to be processed by the client-side resources.

Example 8 includes the computer system as defined in example 1, wherein the global model is to cause the client-side resources to at least one of identify computing device types or perform anomaly detection.

Example 9 includes At least one non-transitory machine readable storage medium comprising instructions that, when executed by a processor, cause the processor to at least generate a first modeling plan for client-side resources, transmit the first modeling plan to the client-side resources, search for a primary validation flag in response to retrieving client-side model parameters, in response to detecting the primary validation flag, perform a secondary validation corresponding to the client-side model parameters using a server-side ground truth data set, and determine whether to update a global model with the client-side model parameters based on a comparison of results of the secondary validation and a validation threshold.

Example 10 includes the at least one non-transitory machine readable storage medium as defined in example 9, wherein the instructions, when executed, cause the processor to authorize updating of the global model when the results of the secondary validation satisfy the validation threshold.

Example 11 includes the at least one non-transitory machine readable storage medium as defined in example 9, wherein the instructions, when executed, cause the processor to prohibit updating of the global model when the results of the secondary validation do not satisfy the validation threshold.

Example 12 includes the at least one non-transitory machine readable storage medium as defined in example 11, wherein the instructions, when executed, cause the processor to send a second modeling plan to the client-side resources in response to rejecting the client-side modeling parameters, and cause the client-side resources to execute the second modeling plan instead of the first modeling plan.

Example 13 includes the at least one non-transitory machine readable storage medium as defined in example 9, wherein the first modeling plan includes tokenized model parameters devoid of telemetry labels.

Example 14 includes the at least one non-transitory machine readable storage medium as defined in example 9, wherein the first modeling plan includes a transmission schedule for the client-side resources.

Example 15 includes the at least one non-transitory machine readable storage medium as defined in example 14, wherein the transmission schedule includes at least one of a target epoch, a quantity of training dataset iterations, or a quantity of training samples to be processed by the client-side resources.

Example 16 includes the at least one non-transitory machine readable storage medium as defined in example 9, wherein the instructions, when executed, cause the processor to cause the client-side resources to at least one of identify computing device types or perform anomaly detection.

Example 17 includes a method to update a global model, comprising generating a first modeling plan for client-side resources, transmitting the first modeling plan to the client-side resources, searching for a primary validation flag in response to retrieving client-side model parameters, in response to detecting the primary validation flag, performing a secondary validation corresponding to the client-side model parameters using a server-side ground truth data set, and determining whether to update the global model with the client-side model parameters based on a comparison of results of the secondary validation and a validation threshold.

Example 18 includes the method as defined in example 17, further including authorizing updating of the global model when the results of the secondary validation satisfy the validation threshold.

Example 19 includes the method as defined in example 17, further including prohibiting updating of the global model when the results of the secondary validation do not satisfy the validation threshold.

Example 20 includes the method as defined in example 19, further including sending a second modeling plan to the client-side resources in response to rejecting the client-side modeling parameters, and causing the client-side resources to execute the second modeling plan instead of the first modeling plan.

Example 21 includes the method as defined in example 17, wherein the first modeling plan includes tokenized model parameters devoid of telemetry labels.

Example 22 includes the method as defined in example 17, wherein the first modeling plan includes a transmission schedule for the client-side resources.

Example 23 includes the method as defined in example 22, wherein the transmission schedule includes at least one of a target epoch, a quantity of training dataset iterations, or a quantity of training samples to be processed by the client-side resources.

Example 24 includes the method as defined in example 17, further including causing the client-side resources to at least one of identify computing device types or perform anomaly detection.

Example 25 includes a computing system to update a global model, comprising a client configuration manager to retrieve a first modeling plan from a server, and update a local model with first tokenized parameters associated with telemetry data corresponding to the server, the first tokenized parameters included in the first modeling plan, a client training manager to extract trigger parameters from the first modeling plan to cause the local model to train with client telemetry data for a threshold quantity of iterations, a client-side model accuracy calculator to calculate an accuracy metric of the local model based on client-side ground truth data, and a client-side model validator to label the local model as one of valid or invalid based on a comparison between the accuracy metric and an accuracy threshold.

Example 26 includes the computing system as defined in example 25, further including a client reporting manager to tokenize telemetry data corresponding to the local model in response to the client-side model validator labeling the local model as valid.

Example 27 includes the computing system as defined in example 26, wherein the client reporting manager is to transmit parameters corresponding to the local model to the server when the local model is labeled valid.

Example 28 includes the computing system as defined in example 25, further including a client reporting manager to transmit an indication of model invalidity when the accuracy threshold is not satisfied, the indication of model invalidity to cause the server to send a second modeling plan.

Example 29 includes the computing system as defined in example 28, wherein the client configuration manager is to discard configuration parameters corresponding to the first modeling plan and enforce configuration parameters corresponding to the second modeling plan.

Example 30 includes the computing system as defined in example 25, wherein the client training manager is to update a quantity of neural network layers based on the retrieved modeling plan.

Example 31 includes At least one non-transitory machine readable storage medium comprising instructions that, when executed by a processor, cause the processor to at least retrieve a first modeling plan from a server, update a local model with first tokenized parameters associated with telemetry data corresponding to the server, the first tokenized parameters included in the first modeling plan, extract trigger parameters from the first modeling plan to cause the local model to train with client telemetry data for a threshold quantity of iterations, calculate an accuracy metric of the local model based on client-side ground truth data, and label the local model as one of valid or invalid based on a comparison between the accuracy metric and an accuracy threshold.

Example 32 includes the at least one non-transitory machine readable storage medium as defined in example 31, wherein the instructions, when executed, cause the processor to tokenize telemetry data corresponding to the local model in response to the client-side model validator labeling the local model as valid.

Example 33 includes the at least one non-transitory machine readable storage medium as defined in example 32, wherein the instructions, when executed, cause the processor to transmit parameters corresponding to the local model to the server when the local model is labeled valid.

Example 34 includes the at least one non-transitory machine readable storage medium as defined in example 31, wherein the instructions, when executed, cause the processor to transmit an indication of model invalidity when the accuracy threshold is not satisfied, the indication of model invalidity to cause the server to send a second modeling plan.

Example 35 includes the at least one non-transitory machine readable storage medium as defined in example 34, wherein the instructions, when executed, cause the processor to discard configuration parameters corresponding to the first modeling plan and enforce configuration parameters corresponding to the second modeling plan.

Example 36 includes the at least one non-transitory machine readable storage medium as defined in example 31, wherein the instructions, when executed, cause the processor to update a quantity of neural network layers based on the retrieved modeling plan.

Example 37 includes a method to update a global model, comprising retrieving a first modeling plan from a server, updating a local model with first tokenized parameters associated with telemetry data corresponding to the server, the first tokenized parameters included in the first modeling plan, extracting trigger parameters from the first modeling plan to cause the local model to train with client telemetry data for a threshold quantity of iterations, calculating an accuracy metric of the local model based on client-side ground truth data, and labelling the local model as one of valid or invalid based on a comparison between the accuracy metric and an accuracy threshold.

Example 38 includes the method as defined in example 37, further including tokenizing telemetry data corresponding to the local model in response to the client-side model validator labeling the local model as valid.

Example 39 includes the method as defined in example 38, further including transmitting parameters corresponding to the local model to the server when the local model is labeled valid.

Example 40 includes the method as defined in example 37, further including transmitting an indication of model invalidity when the accuracy threshold is not satisfied, the indication of model invalidity to cause the server to send a second modeling plan.

Example 41 includes the method as defined in example 40, further including discarding configuration parameters corresponding to the first modeling plan and enforce configuration parameters corresponding to the second modeling plan.

Example 42 includes the method as defined in example 37, further including updating a quantity of neural network layers based on the retrieved modeling plan.

Example 43 includes a server to distribute software on a network, the server comprising at least one storage device including first instructions and second instructions, and at least one processor to execute the second instructions to transmit the first instructions over a network, the first instructions, when executed, to cause at least one device to generate a first modeling plan for client-side resources, transmit the first modeling plan to the client-side resources, search for a primary validation flag in response to retrieving client-side model parameters, in response to detecting the primary validation flag, perform a secondary validation corresponding to the client-side model parameters using a server-side ground truth data set, and determine whether to update the global model with the client-side model parameters based on a comparison of results of the secondary validation and a validation threshold.

Example 44 includes the server as defined in example 43, wherein the first instructions, when executed, to cause at least one device to authorize updating of the global model when the results of the secondary validation satisfy the validation threshold.

Example 45 includes the server as defined in example 43, wherein the first instructions, when executed, to cause at least one device to prohibit updating of the global model when the results of the secondary validation do not satisfy the validation threshold.

Example 46 includes the server as defined in example 45, wherein the first instructions, when executed, to cause at least one device to send a second modeling plan to the client-side resources in response to rejecting the client-side modeling parameters, and cause the client-side resources to execute the second modeling plan instead of the first modeling plan.

Example 47 includes the server as defined in example 43, wherein the first instructions, when executed, to cause at least one device to cause the client-side resources to at least one of identify computing device types or perform anomaly detection.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computer system to update a global model, comprising:
   memory;
   machine readable instructions; and
   processor circuitry to at least one of instantiate or execute the machine readable instructions to:
   generate a first modeling plan for client-side resources, the first modeling plan including (a) tokenized model parameters devoid of telemetry labels and (b) a transmission schedule for the client-side resources;
   transmit the first modeling plan to the client-side resources;
   search for a primary validation flag in response to retrieving client-side model parameters;
   in response to detecting the primary validation flag, perform a secondary validation corresponding to the client-side model parameters using a server-side ground truth data set, the secondary validation based on calculating a confidence metric in view of the server-side ground truth data set and determining that the confidence metric satisfies a validation threshold;
   authorize updating of the global model in response to results of the secondary validation satisfying the validation threshold;
   in response to the confidence metric not satisfying the validation threshold, prohibit updating the global model with the client-side model parameters;
   send a second modeling plan to the client-side resources in response to rejecting the client-side modeling parameters; and
   cause the client-side resources to execute the second modeling plan instead of the first modeling plan.

2. The computer system as defined in claim 1, wherein the transmission schedule includes at least one of a target epoch, a quantity of training dataset iterations, a periodicity of communication with a server for a next training iteration, or a quantity of training samples to be processed by the client-side resources.

3. The computer system as defined in claim 1, wherein the global model is to cause the client-side resources to at least one of identify computing device types or perform anomaly detection.

4. At least one non-transitory machine readable storage medium comprising instructions that cause a processor to at least:
   generate a first modeling plan for client-side resources, the first modeling plan including (a) tokenized model parameters devoid of telemetry labels and (b) a transmission schedule for the client-side resources;
   transmit the first modeling plan to the client-side resources;
   search for a primary validation flag in response to retrieving client-side model parameters;
   in response to detecting the primary validation flag, perform a secondary validation corresponding to the client-side model parameters using a server-side ground truth data set, the secondary validation based on calculating a confidence metric corresponding to the server-side ground truth data set and determining that the confidence metric satisfies a validation threshold;
   authorize updating of a global model in response to results of the secondary validation satisfying the validation threshold;
   in response to the confidence metric not satisfying the validation threshold, prohibit updating the global model with the client-side model parameters;
   send a second modeling plan to the client-side resources in response to rejecting the client-side modeling parameters; and
   cause the client-side resources to execute the second modeling plan instead of the first modeling plan.

5. The at least one non-transitory machine readable storage medium as defined in claim 4, wherein the transmission schedule includes at least one of a target epoch, a quantity of training dataset iterations, or a quantity of training samples to be processed by the client-side resources.

6. The at least one non-transitory machine readable storage medium as defined in claim 4, wherein the instructions cause the processor to cause the client-side resources to at least one of identify computing device types or perform anomaly detection.

7. A method to update a global model, comprising:
   generating a first modeling plan for client-side resources, the first modeling plan including (a) tokenized model parameters devoid of telemetry labels and (b) a transmission schedule for the client-side resources;
   transmitting the first modeling plan to the client-side resources;
   searching for a primary validation flag in response to retrieving client-side model parameters;
   in response to detecting the primary validation flag, performing a secondary validation corresponding to the client-side model parameters using a server-side ground truth data set, the secondary validation based on calculating a confidence metric in view of the server-side ground truth data set;
   authorize updating of the global model in response to results of the secondary validation satisfying a validation threshold;
   in response to determining that the confidence metric does not satisfy a validation threshold prohibit updating the global model with the client-side model parameters;
   sending a second modeling plan to the client-side resources in response to rejecting the client-side modeling parameters; and
   causing the client-side resources to execute the second modeling plan instead of the first modeling plan.

8. The method as defined in claim 7, wherein the transmission schedule includes at least one of a target epoch, a quantity of training dataset iterations, or a quantity of training samples to be processed by the client-side resources.

9. The method as defined in claim 7, further including causing the client-side resources to at least one of identify computing device types or perform anomaly detection.

* * * * *